United States Patent
Itoh et al.

(10) Patent No.: US 9,036,121 B2
(45) Date of Patent: May 19, 2015

(54) LIQUID CRYSTAL DISPLAY PANEL AND LIQUID CRYSTAL DISPLAY DEVICE

(75) Inventors: Ryohki Itoh, Osaka (JP); Yuhko Hisada, Osaka (JP); Satoshi Horiuchi, Osaka (JP); Takaharu Yamada, Osaka (JP); Masahiro Yoshida, Osaka (JP)

(73) Assignee: UNIFIED INNOVATIVE TECHNOLOGY, LLC, Wilmington, DE (US)

( * ) Notice: Subject to any disclaimer, the term of this patent is extended or adjusted under 35 U.S.C. 154(b) by 362 days.

(21) Appl. No.: 13/641,949

(22) PCT Filed: Feb. 18, 2011

(86) PCT No.: PCT/JP2011/053539
§ 371 (c)(1), (2), (4) Date: Oct. 18, 2012

(87) PCT Pub. No.: WO2011/132452
PCT Pub. Date: Oct. 27, 2011

(65) Prior Publication Data
US 2013/0033469 A1 Feb. 7, 2013

(30) Foreign Application Priority Data
Apr. 20, 2010 (JP) .................................. 2010-097193

(51) Int. Cl.
G02F 1/1343 (2006.01)
G02F 1/1362 (2006.01)

(52) U.S. Cl.
CPC .... *G02F 1/136286* (2013.01); *G02F 1/136209* (2013.01); *G02F 2201/123* (2013.01); *G02F 2001/136218* (2013.01)

(58) Field of Classification Search
CPC .................................................. G02F 1/134309
USPC ........................................................... 349/139
See application file for complete search history.

(56) References Cited

U.S. PATENT DOCUMENTS

| 6,411,346 B1 | 6/2002 | Numano et al. |
| 7,193,673 B2 | 3/2007 | Ahn et al. |
| 2003/0107695 A1 | 6/2003 | Kubo et al. |

(Continued)

FOREIGN PATENT DOCUMENTS

| CN | 101128881 A | 2/2005 |
| JP | 2000-002889 A | 1/2000 |

(Continued)

OTHER PUBLICATIONS

Official Communication issued in International Patent Application No. PCT/JP2011/053539, mailed on May 17, 2011.

*Primary Examiner* — Timothy L Rude
(74) *Attorney, Agent, or Firm* — Birch, Stewart, Kolasch & Birch, LLP

(57) ABSTRACT

Picture element electrodes (7) are electrically connected with drain electrodes (18D) of respective transistor elements (18). The picture element electrodes (7) and data signal lines (SLn, SLn+1, . . . ) are provided above scanning signal lines (GLn, GLn+1, . . . ). The picture element electrodes (7) overlap scanning signal lines (GLn, GLn+1, . . . ) when viewed from above. Notch parts 7a and 7b are provided in each picture element electrode (7) so as to overlap each of the scanning signal lines (GLn, GLn+1, . . . ). Shield electrodes (4a, 4b) are formed in the same layer as the data signal lines (SLn, SLn+1, . . . ). Each of the scanning signal lines (GLn, GLn+1, . . . ) at least partially overlaps the shield electrodes (4a, 4b) in the notch parts (7a, 7b), when viewed from above. This provides the liquid crystal display panel having wide viewing angle characteristic and carrying out high quality display.

16 Claims, 12 Drawing Sheets

(56) References Cited

U.S. PATENT DOCUMENTS

| | | |
|---|---|---|
| 2006/0158574 A1 | 7/2006 | Kubo et al. |
| 2007/0097280 A1 | 5/2007 | Choi et al. |
| 2010/0253896 A1 | 10/2010 | Mochizuki et al. |
| 2010/0328558 A1 | 12/2010 | Asada et al. |
| 2011/0102725 A1 | 5/2011 | Katsumoto et al. |
| 2011/0273653 A1 | 11/2011 | Yoshida et al. |

FOREIGN PATENT DOCUMENTS

| | | |
|---|---|---|
| JP | 2003-228073 A | 8/2003 |
| JP | 2005-003916 A | 1/2005 |
| JP | 2006-058737 A | 3/2006 |
| JP | 2007-128094 A | 5/2007 |
| WO | 2009/013855 A1 | 1/2009 |
| WO | 2009/130819 A1 | 10/2009 |
| WO | 2009/157157 A1 | 12/2009 |

LIQUID CRYSTAL DISPLAY PANEL AND LIQUID CRYSTAL DISPLAY DEVICE

TECHNICAL FIELD

The present invention relates to a liquid crystal display panel and a liquid crystal display device. In particular, the present invention relates to a liquid crystal display panel and a liquid crystal display device in which one (1) picture element is divided into a plurality of domains such that liquid crystal molecules can be oriented in multiple directions.

BACKGROUND ART

In recent years, liquid crystal display devices are rapidly becoming popular as alternatives to cathode-ray tubes (CRTs). Such liquid crystal display devices are used in a wide variety of devices, such as television devices, monitors, and mobile phones, because of their characteristics such as energy saving, reduced thickness, and lightweight.

In particular, there has been recently grown the so-called mobile device equipped with (i) a battery functioning as a power supply and having limited capacity and (ii) a liquid crystal display device functioning as display means.

In such a mobile device, the battery having limited capacity is employed as the power supply. Therefore, for a longer continuous operation time of the mobile device, greater importance is placed on reduction of power consumption of the liquid crystal display device.

Under the circumstances, attention has been given to a technique of realizing low power consumption of a liquid crystal display device by (i) increasing an aperture ratio and transmittance of a liquid crystal display panel provided in the liquid crystal display device and (ii) reducing a light amount of a backlight accordingly.

The liquid crystal display device most commonly used in the past is a TN (Twisted Nematic) mode liquid crystal display device which uses liquid crystal molecules having a positive dielectric anisotropy. However, such a TN mode liquid crystal display device has the problem that image quality such as a contrast and a color tone is significantly deteriorated when the liquid crystal display device is viewed at oblique angles from above, from underneath, from the left side, and from the right side, as compared with when viewed from the front.

That is, the TN mode liquid crystal display device has high dependence of image quality on viewing angles, and is therefore not suitable for an application in which the liquid crystal display device is expected to be viewed from a direction other than the front.

An IPS (In-Plane Switching) mode liquid crystal display device and an MVA (Multi-domain Vertical Alignment) mode liquid crystal display device are known as liquid crystal display devices in which such dependence of image quality on viewing angles is improved.

For example, according to the MVA mode liquid crystal display device, at least one of two substrates, between which a liquid crystal layer is interposed, has, on its side contacting the liquid crystal layer, (i) a transparent electrode with protrusions that function as orientation separation means and/or (ii) a transparent electrode with slits that function as orientation separation means. With such a transparent electrode(s), each picture element has regions where the liquid crystal molecules are oriented in respective different directions, and this achieves a wide viewing angle characteristic.

FIG. 11 illustrates a schematic configuration of a conventional liquid crystal display device 110 which includes (i) an active matrix substrate having picture element electrodes 160 each of which is made up of subpixel electrodes 163a, 163b, and 163c and slit regions R1 and (ii) a counter substrate having ribs (rivets) or notch sections.

A picture element 114 having a laterally-long shape is substantially evenly divided into subpixels 115a, 115b, and 115c. Further, a picture element electrode 160 is also evenly divided into the subpixel electrodes 163a, 163b, and 163c which correspond to the respective subpixels 115a, 115b, and 115c (see FIG. 11).

Each of the subpixel electrodes 163a, 163b, and 163c has a substantially square shape. Each slit region R1 is provided, by cutting out the picture element electrode 160, (i) between the subpixel electrodes 163a and 163b and (ii) between the subpixel electrodes 163b and 163c.

For each of the picture elements 114, a TFT 150 having a gate electrode 152, a source electrode 154, and a drain electrode 156 is provided. The subpixel electrode 163a is electrically connected with the drain electrode 156 via a contact hole 168.

The subpixel electrode 163a and the subpixel electrode 163b, which are separated by the slit region R1, are electrically connected with each other via a subpixel electrode connection part 165. Similarly, the subpixel electrode 163b and the subpixel electrode 163c, which are separated by the slit region R1, is electrically connected with each other via a subpixel electrode connection part 165.

As such, the subpixel electrodes 163a, 163b, and 163c are electrically connected with the drain electrode 156 via the contact hole 168 (see FIG. 11).

A scanning signal line 132, electrically connected with the gate electrode 152, is provided below the laterally-long picture element 114 so as to extend in an X direction (lateral direction) in FIG. 11. A storage capacitor line 136, which is formed in a layer in which the gate electrode 152 is formed, is provided substantially in the middle of the picture element 114 so as to extend in parallel with the scanning signal line 132. A data signal line 135, which is electrically connected with the source electrode 154, is provided in a left edge area of the picture element 114 so as to extend in a Y direction (longitudinal direction) in FIG. 11. Further, a storage capacitor counter electrode 140, which is electrically connected with the drain electrode 156, is provided so that, when viewed from the front of the panel, the storage capacitor counter electrode 140 and the storage capacitor line 136 overlap each other via an insulating layer.

On the other hand, ribs 100a (rivet) or notch sections are provided on a side of the counter substrate such that the ribs 100a or the notch sections are located substantially in center parts of the respective subpixel electrodes 163a, 163b, and 163c when the active matrix substrate and the counter substrate are combined together.

According to the configuration, orientation separation means is provided in each of the active matrix substrate and the counter substrate. This makes it possible to provide a liquid crystal display device having a wide viewing angle characteristic.

However, the scanning signal line 132 is provided between adjacent picture element electrodes 160 (see FIG. 11), and, in the liquid crystal display device 110 having the laterally-long picture elements 114, a length of an area, in which the scanning signal line 132 is close to the picture element electrode 160, is long. Therefore, in the liquid crystal display device 110, an oblique electric field is caused in a region R40 located between the scanning signal line 132 and the picture element electrode 160. In the region R40, therefore, orientations of liquid crystal molecules are disordered, and light leakages are caused. This leads to a problem that roughness of image and display unevenness are more likely to be caused by such orientation disorders and light leakages.

Patent Literature 1 discloses a configuration for shielding an electric field of a scanning signal line 132, which electric field causes an orientation disorder of liquid crystal molecules (see FIG. 12). According to the configuration, the scanning signal line 132 is located substantially in the middle of a picture element 114, and the scanning signal line 132 is covered with subpixel electrodes 163*a*, 163*b*, and 163*c* and subpixel electrode connection parts 165 via an insulating layer. With the configuration, the electric field of the scanning signal line 132 is shielded.

According to Patent Literature 1, it is disclosed that a liquid crystal display device can be provided which (i) can suppress an orientation disorder of liquid crystal molecules, (ii) has a wide viewing angle characteristic, and (iii) has improved display quality.

CITATION LIST

Patent Literature

[Patent Literature 1]
International Publication No. WO2009/130819 (Publication date: Oct. 29, 2009)
[Patent Literature 2]
Japanese Patent Application Publication Tokukai No. 2007-128094 A (Publication date: May 24, 2007)
[Patent Literature 3]
Japanese Patent Application Publication Tokukai No. 2006-58737 A (Publication date: Mar. 2, 2006)

SUMMARY OF INVENTION

Technical Problem

However, according to the configuration disclosed in Patent Literature 1, the subpixel electrodes 163*a*, 163*b*, and 163*c* and the subpixel electrode connection parts 165, which are provided in the same layer, are used to shield the electric field of the scanning signal line 132. In the configuration, locations where the subpixel electrode connection parts 165 are provided are limited to locations directly above the scanning signal line 132.

Moreover, according to the configuration, ribs 100*a* (rivet) or notch sections, which are provided on a side of the counter substrate and serve as orientation separation means for the subpixel electrodes 163*a*, 163*b*, and 163*c*, are provided such that the scanning signal line 132 and the ribs 100*a* or the notch sections overlap each other when viewed from the front of panel, by taking into consideration transmittance of a liquid crystal display device 110*a* (see FIG. 12).

In other words, (i) the subpixel electrode connection part 165 via which the subpixel electrode 163*a* and the subpixel electrode 163*b* are electrically connected with each other and (ii) the subpixel electrode connection part 165 via which the subpixel electrode 163*b* and the subpixel electrode 163*c* are electrically connected with each other are provided on a virtual line connecting the ribs 100*a* or the notch sections, which are provided on the side of the counter substrate and serve as orientation separation means for the subpixel electrodes 163*a*, 163*b*, and 163*c*.

According to the configuration, since the locations where the subpixel electrode connection parts 165 are provided are limited to locations directly above the scanning signal line 132, (i) a shape of the picture element electrode 160 made up of the subpixel electrodes 163*a*, 163*b*, and 163*c* and the subpixel electrode connection parts 165 and (ii) a shape of the slit region R1 are also limited. This causes a problem that the picture element electrode 160 and the slit region R1 cannot have optimal shapes for orientation separation of liquid crystal molecules.

The present invention is accomplished in view of the problem, and its object is to provide a liquid crystal display panel and a liquid crystal display device which have a wide viewing angle characteristic and can carry out a high quality display.

Solution to Problem

In order to attain the object, a liquid crystal display panel of the present invention includes: a first insulating substrate having (i) scanning signal lines, (ii) data signal lines intersecting with the scanning signal lines, and (iii) a plurality of transistor elements electrically connected with the scanning signal lines and the data signal lines; a second insulating substrate provided to face the first insulating substrate; and a liquid crystal layer provided between the first insulating substrate and the second insulating substrate, the plurality of transistor elements being provided for respective of a plurality of picture elements arranged in a matrix manner, a plurality of picture element electrodes being (i) provided for the respective plurality of picture elements, (ii) provided on the first insulating substrate, and (iii) electrically connected with drain electrodes of the respective plurality of transistor elements, (a) a layer where the plurality of picture element electrodes are formed and (b) a layer where the data signal lines are formed, being located above a layer where the scanning signal lines are formed, in a region of each of the picture elements in which region a corresponding one of the plurality of picture element electrodes is formed, (i) the corresponding one of the plurality of picture element electrodes and (ii) a corresponding one of the scanning signal lines being formed to overlap each other when viewed from above, the corresponding one of the plurality of picture element electrodes having a notch part in a region in which the corresponding one of the plurality of picture element electrodes and the corresponding one of the scanning signal lines overlap each other, a shield electrode being formed, in the layer where the data signal lines are formed, so that (i) the shield electrode and (ii) part of the corresponding one of the scanning signal lines in the notch part at least partially overlap each other when viewed from above.

According to the configuration, the picture element electrode of each of the plurality of picture elements and the scanning signal line overlap each other when viewed from above. That is, in each of the plurality of picture elements, the scanning signal line is covered with the picture element electrode, which is provided above the scanning signal line. This makes it possible to suppress an orientation disorder of liquid crystal molecules, which is caused by an electric field generated by a scanning signal on the scanning signal line.

Moreover, the part of the scanning signal line and the shield electrode at least partially overlap each other, when viewed from above. Here, the part of the scanning signal line (i) is located in the notch part serving as orientation separation means for liquid crystal molecules and (ii) is not covered with the picture element electrode. Moreover, the shield electrode is formed in a layer (i) in which the data signal lines are formed and (ii) which lies above a layer in which the scanning signal lines are formed.

According to the configuration, the picture element electrode and the shield electrode, formed in the layer in which the data signal lines are formed, serve to suppress the orientation disorder of the liquid crystal molecules due to the electric field caused by the scanning signal line through which a signal, which is different from that supplied to the picture element electrode, is supplied.

Moreover, according to the configuration, the shield electrode also serves to block light in an area in which an orientation disorder is caused by the scanning signal line. This makes it possible to improve a contrast and to reduce an afterimage. Therefore, display quality is improved.

Since the shield electrode is formed in the layer in which the data signal lines are formed, the picture element electrode can be formed so as to have an optimal shape for orientation separation of liquid crystal molecules.

This allows the liquid crystal display panel to have a wide viewing angle characteristic and to carry out a high quality display.

In order to attain the object, a liquid crystal display device of the present invention includes the above described liquid crystal display panel.

This allows the liquid crystal display device to have a wide viewing angle characteristic and to carry out a high quality display.

Advantageous Effects of Invention

As above described, the liquid crystal display panel of the present invention includes the plurality of picture element electrodes which is (i) provided for the respective plurality of picture elements, (ii) provided on the first insulating substrate, and (iii) electrically connected with drain electrodes of the respective plurality of transistor elements, (a) a layer where the plurality of picture element electrodes are formed and (b) a layer where the data signal lines are formed, being located above a layer where the scanning signal lines are formed, in a region of each of the picture elements in which region a corresponding one of the plurality of picture element electrodes is formed, (i) the corresponding one of the plurality of picture element electrodes and (ii) a corresponding one of the scanning signal lines being formed to overlap each other when viewed from above, the corresponding one of the plurality of picture element electrodes having a notch part in a region in which the corresponding one of the plurality of picture element electrodes and the corresponding one of the scanning signal lines overlap each other, a shield electrode being formed, in the layer where the data signal lines are formed, so that (i) the shield electrode and (ii) part of the corresponding one of the scanning signal lines in the notch part at least partially overlap each other when viewed from above.

Moreover, as above described, the liquid crystal display device of the present invention includes the above described liquid crystal display panel.

This allows the liquid crystal display panel and the liquid crystal display device to have a wide viewing angle characteristic and to carry out a high quality display.

BRIEF DESCRIPTION OF DRAWINGS

FIG. 1 is a plane view illustrating a schematic shape of a picture element section provided in a liquid crystal display panel, in accordance with an embodiment of the present invention.

FIG. 2 is a cross sectional view taken along the line A-A of FIG. 1.

FIG. 3 is a plane view of the liquid crystal display panel shown in FIG. 1, in which no shield electrode is provided.

FIG. 4 is a plane view illustrating a schematic shape of a picture element section provided in a liquid crystal display panel, in accordance with another embodiment of the present invention.

FIG. 5 is an explanatory view for explaining how to repair a disconnection part (defective part), which is caused in a part of a data signal line of the liquid crystal display panel shown in FIG. 4, by the use of a shield electrode.

FIG. 6 is a plane view illustrating a schematic shape of a picture element section provided in a liquid crystal display panel, in accordance with yet another embodiment of the present invention.

FIG. 7 is an explanatory view for explaining how to repair a disconnection part (defective part), which is caused in a part of a data signal line of the liquid crystal display panel shown in FIG. 6, by the use of a shield electrode.

FIG. 8 is a plane view illustrating a schematic shape of a picture element section provided in a liquid crystal display panel, in accordance with still another embodiment of the present invention.

FIG. 9 is an explanatory view for explaining how to repair a disconnection part (defective part), which is caused in a part of a data signal line of the liquid crystal display panel shown in FIG. 8, by the use of an electrode and a counter electrode which are provided between immediately adjacent two picture elements.

FIG. 10 is a plane view illustrating a schematic shape of a picture element section provided in a liquid crystal display panel, in accordance with still another embodiment of the present invention.

FIG. 11 illustrates a schematic configuration of a conventional liquid crystal display device.

FIG. 12 illustrates a schematic configuration of a conventional liquid crystal display device.

FIG. 13 illustrates a schematic configuration of a conventional liquid crystal display device in which an auxiliary wire for reparation is provided outside of a display area.

DESCRIPTION OF EMBODIMENTS

The following description will discuss embodiments of the present invention in detail, with reference to drawings. Note, however, that the descriptions of dimensions, materials, and shapes of constituent members, and their relative configurations etc. in the embodiments merely exemplify an embodiment of the present invention, and therefore should not be construed as limiting the scope of the invention only to them.

[Embodiment 1]

Figure 1:
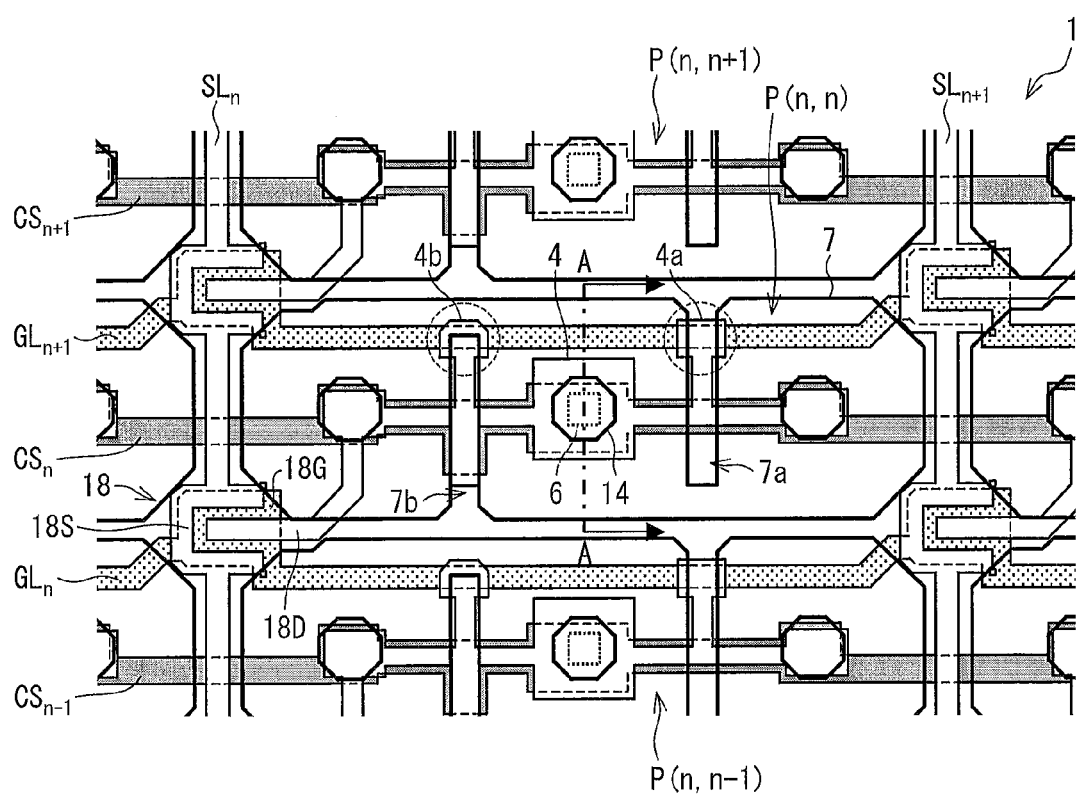
FIG. 1
Figure 2:
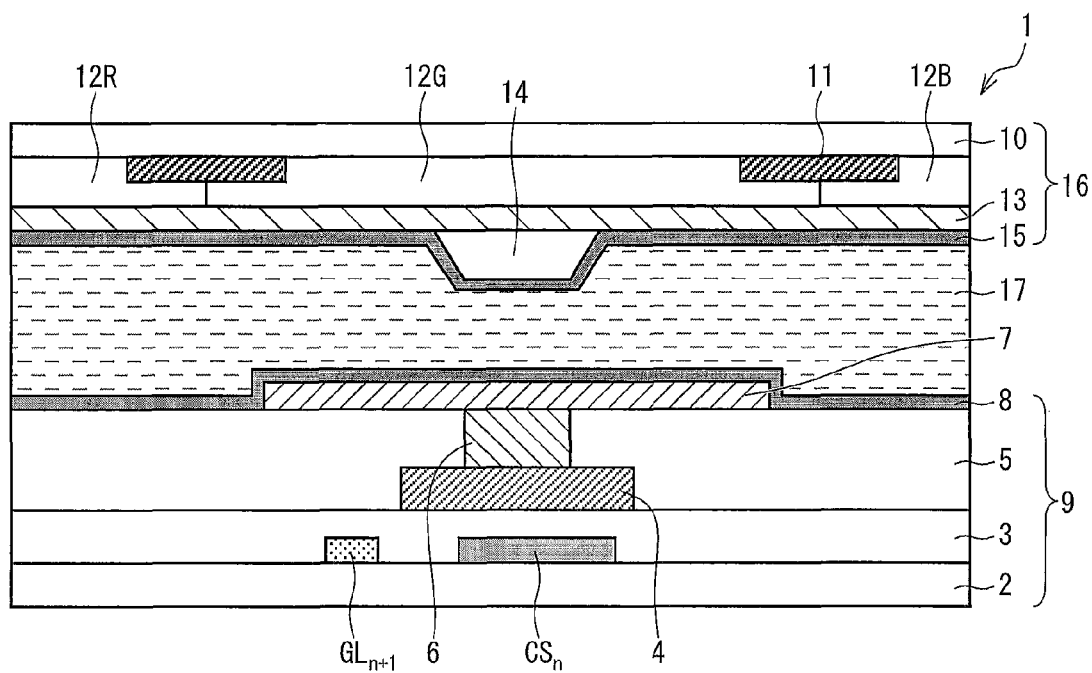
FIG. 2
Figure 3:
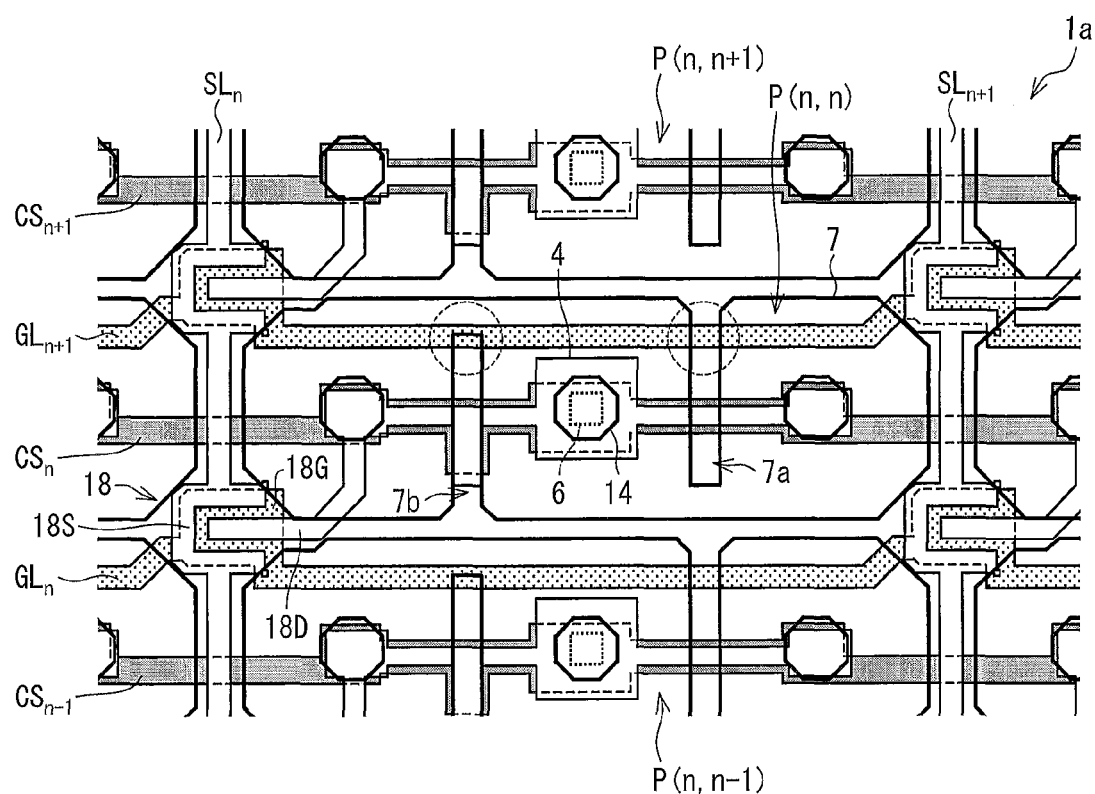
FIG. 3

The following description will discuss Embodiment 1 of the present invention, with reference to FIGS. 1 through 3.

Embodiment 1 will describe a VA (Vertical Alignment) mode liquid crystal display panel whose picture element electrode configuration has a CPA (Continuous Pinwheel Alignment) configuration. Note, however, that the present invention is not limited to this. The present invention can be applied, provided that (i) a scanning signal line is not completely covered with a picture element electrode (or sub-picture-element electrodes) in each picture element formation area and (ii) the scanning signal line, which is not covered with the picture element electrode, exists in each picture element. Examples of the picture element electrode to which the present invention is applicable encompass (i) a picture element electrode having an MVA (Multidomain Vertical Alignment) mode slits, (ii) an IPS (In Plane Switching) mode comb-teeth picture element electrode, (iii) a TBA (Transverse Bend Alignment) mode comb-teeth picture element electrode, and (iv) a picture element electrode having a fish-bone shape.

Note that the CPA configuration refers to a configuration in which (i) an alignment controlling member, such as a protrusion or a notch part, is provided on a common electrode of a counter substrate so as to be located in a center of each picture element and (ii) a picture element electrode, which is provided on an active matrix substrate facing the counter substrate, is formed so as to be in accordance with a shape of the alignment controlling member. With the configuration, liquid crystal molecules are consecutively oriented in all directions between the alignment controlling members.

The TBA mode causes liquid crystal molecules to be vertically oriented in response to an applied horizontal electric field. Specifically, as with the IPS mode, the TBA mode (i) employs a comb-teeth picture element electrode and a counter electrode which are provided on a side of an active matrix substrate and (ii) controls liquid crystal molecules by use of a horizontal electric field. Note, however, that the liquid crystal molecules are, unlike the IPS mode, not controlled to be horizontally aligned but are controlled, like the VA mode, to be vertically aligned.

FIG. 2 illustrates a schematic configuration of a liquid crystal display panel 1, in accordance with Embodiment 1 of the present invention.

The liquid crystal display panel 1 includes (i) an array substrate 9 serving as a first substrate (first insulating substrate), (ii) a counter substrate 16 serving as a second substrate (second insulating substrate), and (iii) a liquid crystal layer 17 which is (a) provided between the array substrate 9 and the counter substrate 16 and (b) made of a liquid crystal material having a negative dielectric anisotropy (see FIG. 2).

The array substrate 9 includes (i) a glass substrate 2, serving as an insulating substrate, on which a TFT element (transistor element) (not illustrated), (ii) a scanning signal line GLn+1 which is electrically connected with a gate electrode of the TFT element, (iii) a storage capacitor line CSn, the scanning signal line GLn+1 and the storage capacitor line CSn being provided in a single layer, (iv) a gate insulating film 3 (first insulating layer) provided over the scanning signal line GLn+1 and the storage capacitor line CSn, and (v) a storage capacitor counter line 4 provided on the gate insulating film 3 such that the storage capacitor counter line 4 and the storage capacitor line CSn overlap each other, when the liquid crystal display panel 1 is viewed from above, the storage capacitor counter line 4 and a data signal line (not illustrated) being provided in a single layer. Note that the storage capacitor counter line 4 is electrically connected with a drain electrode of the TFT element.

The array substrate 9 further includes (vi) an interlayer insulating film 5 (second insulating layer) which has a contact hole 6 and is provided over the storage capacitor counter line 4, (vii) a picture element electrode 7 provided on the interlayer insulating film 5, and (viii) a vertical alignment film 8 provided over the picture element electrode 7. Note that the picture element electrode 7 is electrically connected with the storage capacitor counter line 4 via the contact hole 6.

Meanwhile, the counter substrate 16 includes a glass substrate 10, serving as an insulating substrate, on which a black matrix 11 and color filter layers 12R, 12G, and 12B are provided. A common electrode 13 is provided so as to cover the entire color filter layers 12R, 12G, and 12B.

A protrusion section 14, which is a protruding structure serving as orientation separation means, is provided on the common electrode 13. Note, however, that the present invention is not limited to this, and a cut part (notch part), which is formed by cutting the common electrode 13, can be employed as the orientation separation means. A cross-sectional shape of the protrusion section 14 is not limited to the one illustrated in FIG. 2 but can be a cross-sectional shape such as a triangular shape or a trapezoidal shape.

According to Embodiment 1, the orientation separation means is provided on the counter substrate 16, by taking into consideration an aperture ratio of the liquid crystal display panel 1, such that (i) a region, in which the storage capacitor line CSn and the storage capacitor counter line 4 overlap each other and (ii) the orientation separation means, at least partially overlap each other when viewed from above. Note, however, that the present invention is not limited to this.

According to Embodiment 1, the protrusion section 14 is made of a photosensitive resist having high transmittance for incident light whose wavelength falls within a visible region and is formed so as to have a predetermined shape. Note, however, that the present invention is not limited to this.

According to Embodiment 1, color filter layers 12R, 12G, and 12B for red, green, and blue colors are provided, for respective picture element electrodes 7, between the glass substrate 10 and the common electrode 13. Note that the picture element electrodes 7 are provided for respective picture elements of the array substrate 9. Note, however, that the present invention is not limited to this. Alternatively, a COA (Color Filter On Array) configuration can be employed in which color filter layers 12R, 12G, and 12B are provided on a side of the array substrate 9.

A vertical alignment film 15 is provided between (i) the liquid crystal layer 17 and (ii) the common electrode 13 and the protrusion section 14.

A polarization plate (not illustrated) is provided on a side of the array substrate 9 which side is opposite to a side facing the liquid crystal layer 17. Another polarization plate (not illustrated) is provided on a side of the counter substrate 16 which side is opposite to a side facing the liquid crystal layer 17.

In a case of providing a transmissive liquid crystal display device, there are provided (i) a liquid crystal display panel 1 having the above configuration, (ii) a backlight for irradiating an entire surface of the liquid crystal display panel 1 with uniform light, and (iii) a driving circuit and a power supply circuit which are used to drive the liquid crystal display panel 1.

The following description will discuss, in more detail, a configuration of the liquid crystal display panel 1, with reference to FIG. 1.

FIG. 1 is a plane view illustrating a schematic shape of a picture element section in the liquid crystal display panel 1 of Embodiment 1.

FIG. 3 is a plane view illustrating a schematic shape of a picture element section of a liquid crystal display panel 1a which has no shield electrodes 4a and 4b, unlike the liquid crystal display panel 1.

Note that, in each of FIGS. 1 and 3, picture element electrodes 7 are not depicted in view of a stacking pattern of the constituent members.

The liquid crystal display panel 1 has picture elements P (P(n, n+1), P(n, n), and so forth) which are arranged in a matrix manner (see FIG. 1). Moreover, TFT elements 18 (each having a gate electrode 18G, a source electrode 18S, and a drain electrode 18D) are provided for the respective picture elements.

Moreover, the liquid crystal display panel 1 has data signal lines SL (SLn, SLn+1, and so forth) and scanning signal lines GL (GLn, GLn+1, and so forth) (see FIG. 1). The TFT elements 18 are provided at respective intersections of the data signal lines SL and the scanning signal lines GL.

An image signal, which is supplied from a data signal line driving circuit (not illustrated), is supplied to picture element electrodes 7 via TFT elements 18. Specifically, a scanning signal line driving circuit (not illustrated) sequentially supplies a scanning signal of high level to a scanning signal line GL. While the scanning signal of high level is being supplied to the scanning signal line GL, TFT elements 18 connected with the scanning signal line GL are turned ON. In response to this, the image signal is supplied, via source electrodes 18S of the TFT elements 18 which are being turned ON, to picture element electrodes 7 connected with drain electrodes 18D of the TFT elements 18 which are being turned ON.

According to Embodiment 1, a storage capacitor counter line 4 is provided for each of the picture elements P (see FIG. 1). The storage capacitor counter lines 4 (i) are electrically connected with the picture element electrodes 7 via the contact holes 6 provided substantially in center parts of the respective picture elements P and (ii) are also electrically connected with drain electrodes 18D of the respective TFT elements 18.

According to Embodiment 1, the picture elements P have respective storage capacitors each of which is defined by (i) a storage capacitor line CS (CSn, CSn+1, and so forth) extending in parallel with the scanning signal lines GL, (ii) the gate insulating film 3, and (iii) a storage capacitor counter line 4. Note, however, that the present invention is not limited to this and the storage capacitors can be provided or omitted as appropriate.

In Embodiment 1, each of the picture element electrodes 7 has a laterally long shape in which (i) a length of the picture element electrodes 7 in a direction in parallel with the scanning signal lines GL is longer than that in a direction in parallel with the data signal lines SL (see FIG. 1).

A picture element electrode 7 has notch parts 7a and 7b (see FIGS. 1 and 3). The notch part 7a is formed by cutting out the picture element electrode 7 from an upper side in FIGS. 1 and 3, whereas the notch part 7b is formed by cutting out the picture element electrode 7 from a lower side in FIGS. 1 and 3. Specifically, the notch part 7a and 7b are formed by patterning the picture element electrode 7 so as not to cause the picture element electrode 7 to be completely divided into parts.

In each of the picture elements P, parts of a scanning signal line GL, which parts are located under respective notch parts 7a and 7b, are not covered with a corresponding picture element electrode 7 (see FIGS. 1 and 3).

According to a configuration in which uncovered part of the scanning signal line GL, to which a signal different from a signal supplied to the picture element electrode 7 is supplied, is not covered with the picture element electrode 7, a disorder of orientation of liquid crystal molecules (hereinafter, simply referred to as "orientation disorder") is caused by an electric field generated by the scanning signal line GL. This causes a problem of a deterioration in display quality of a liquid crystal display panel.

In order to suppress such a problem, Embodiment 1 employs shield electrodes 4a and 4b which are formed so as to cover respective uncovered parts of the scanning signal line GL which uncovered parts are located under the respective notch parts 7a and 7b. The shield electrodes 4a and 4b can be formed by extending the storage capacitor counter line 4 to the uncovered parts. Note that the storage capacitor counter line 4 and the shield electrodes 4a and 4b are formed in a single layer.

According to the configuration, the picture element electrode 7 and the shield electrodes 4a and 4b, which are formed in a layer in which the data signal line SL and the storage capacitor counter line 4 are formed, serve to suppress an orientation disorder caused by an electric field generated by the scanning signal line GL through which the signal is supplied which is different from that supplied to the picture element electrode 7.

Since the shield electrodes 4a and 4b are formed in the layer in which the data signal line SL and the storage capacitor counter line 4 are formed, the picture element electrode 7 can be formed so as to have an optimal shape for orientation separation of liquid crystal molecules.

This allows the liquid crystal display panel 1 to have a wide viewing angle characteristic and to carry out a high quality display.

According to the configuration, the shield electrodes 4a and 4b are electrically connected with the drain electrode 18D which is electrically connected also with the picture element electrode 7. As such, a signal supplied to the picture element electrode 7 can be supplied also to the shield electrodes 4a and 4b. It is therefore possible to provide a liquid crystal display panel 1 which can carry out a display with higher quality.

According to the configuration of Embodiment 1, since the storage capacitor counter line 4 is provided so as to secure the storage capacitor, the shield electrodes 4a and 4b are formed by extending the storage capacitor counter line 4. However, in a case where (i) it is not necessary to provide any storage capacitor and (ii) no storage capacitor counter line 4 is therefore provided, shield electrodes which are electrically connected with the drain electrode 18D can be formed so as to cover the respective uncovered parts of the scanning signal line GL, which uncovered parts are located under the respective notch parts 7a and 7b. In this case, the shield electrodes are formed in a layer in which the drain electrode 18D is formed. Alternatively, shield electrodes can be formed which (i) are formed in a layer in which the drain electrode 18D is formed and (ii) are not electrically connected with the drain electrode 18D.

The picture element electrode 7 is cut out, in Embodiment 1, so that (i) part of the scanning signal line GL in at least one of the notch parts 7a and 7b (the notch part 7b in a case of FIGS. 1 and 3) and (ii) the picture element electrode 7 overlap each other when viewed from above.

With the configuration, since (i) part of the scanning signal line GL in the notch part 7b and (ii) the picture element electrode 7 overlap each other when viewed from above, it is possible to make smaller, by the partial overlapping of the above (i) and (ii), an area of the shield electrode 4b which is formed in a layer where the data signal lines SL and the storage capacitor counter line 4 are formed than that of the shield electrode 4a.

This allows a reduction in parasitic capacitance caused by the shield electrode 4b and the scanning signal line GL.

According to Embodiment 1, the storage capacitor counter line 4 is formed in a layer where the data signal lines SL are formed, via the gate insulating layer 3, so that, when viewed from above, the storage capacitor counter line 4 and the storage capacitor line CS overlap each other in at least the notch parts 7a and 7b (see FIGS. 1 and 2).

With the configuration, a storage capacitor defined by the storage capacitor line CS, the gate insulating layer 3, and the storage capacitor counter line 4 can be secured in each of the notch parts 7a and 7b, i.e., a non-opening part of the picture element P. In the region where the picture electrode 7 is formed in the picture element P (i.e., opening part of the picture element), it is therefore possible to reduce an area where the storage capacitor line CS and the storage capacitor counter line 4 are formed, because the storage capacitor can be secured by the notch parts 7a and 7b.

With the configuration, it is therefore possible to provide a liquid crystal display panel 1 having a high aperture ratio.

In Embodiment 1, the drain electrode 18D and the gate electrode 18G partially overlap each other such that the drain electrode 18D crosses the gate electrode 18G and extends rightward, when viewed from above (see FIG. 1). The storage capacitor counter line 4 and the storage capacitor line CS partially overlap each other such that the storage capacitor counter line 4 also crosses the storage capacitor line CS and extends rightward, when viewed from above (see FIG. 1). That is, it is necessary that a direction, in which the storage capacitor counter line 4 crosses the storage capacitor line CS and extends, be identical with a direction in which the drain electrode 18D crosses the gate electrode 18G and extends.

According to the liquid crystal display panel 1, it is known that an electric potential of the picture element electrode 7 is reduced when the TFT element 18 is turned OFF (i.e., a scanning signal is in a non-active state) due to (i) a parasitic capacitance Cgd caused by the drain electrode 18D (and the picture element electrode 7 electrically connected with the drain electrode 18D) and the scanning signal line GL and (ii) a parasitic capacitance Csd caused by the drain electrode 18D (and the picture element electrode 7 electrically connected with the drain electrode 18D) and the source electrode 18S (and the data signal line SL electrically connected with the source electrode 18S).

A reduction (absolute value) in electric potential is called a "feed-through voltage" (ΔV). In this situation, an effective electric potential (S−ΔV) is applied to the picture element 7, where "S" indicates a signal electric potential to be supplied to the picture element electrode 7. Note that the feed-through voltage ΔV is equal to Cgd×(VH−VL)/(Ccs+Csd+Cgd+Clc), where (i) "VH" indicates an active electric potential of a scanning signal to be supplied via the scanning signal line GL, (ii) "VL" indicates a non-active electric potential of the scanning signal, (iii) "Clc" indicates a liquid crystal capacitance, (iv) "Ccs" is a storage capacitance, and (v) "Csd" is a parasitic capacitance between a data signal line SL and a drain electrode 18D (and a picture element electrode 7 electrically connected with the drain electrode 18D).

With the configuration, even in a case where a wiring pattern is formed while deviated from intended design, a feed-through voltage (ΔV) caused by a variation in parasitic capacitance Cgd is alleviated by a variation in storage capacitance Ccs.

In a case where a drain electrode 18D and a gate electrode 18G are formed such that the drain electrode 18D is displaced rightward with respect to the gate electrode 18G, an area is reduced in which the drain electrode 18D and the gate electrode 18G overlap each other when viewed from above. This causes a parasitic capacitance Cgd to be reduced, and therefore a feed-through voltage ΔV is also reduced in accordance with the formula above described. Meanwhile, an area is also reduced in which a storage capacitor line CS (formed in a layer in which the gate electrode 18G is formed) and a storage capacitor counter line 4 (formed in a layer in which the drain electrode 18D is formed) partially overlap each other. This causes a storage capacitance Ccs to be reduced, and therefore a feed-through voltage ΔV increases in accordance with the formula above described. Consequently, the variation in feed-through voltage ΔV can be suppressed.

On the other hand, in a case where a drain electrode 18D and a gate electrode 18G are formed such that the drain electrode 18D is displaced leftward with respect to the gate electrode 18G, an area is increased in which the drain electrode 18D and the gate electrode 18G overlap each other when viewed from above. This causes a parasitic capacitance Cgd to increase, and therefore a feed-through voltage ΔV also increases in accordance with the formula above described. Meanwhile, an area is also increased in which a storage capacitor line CS (formed in a layer in which the gate electrode 18G is formed) and a storage capacitor counter line 4 (formed in a layer in which the drain electrode 18D is formed) partially overlap each other. This causes a storage capacitance Ccs to be increased, and therefore a feed-through voltage ΔV is reduced in accordance with the formula above described. Consequently, the variation in feed-through voltage ΔV can be suppressed.

Note that FIG. 1 illustrates a configuration in which the wiring pattern has been formed as designed.

According to Embodiment 1, since the shield electrodes 4a and 4b are formed by extending the storage capacitor counter line 4 that is electrically connected with the drain electrode 18D (see FIG. 1), a signal supplied to the picture element electrode 7 can be supplied also to the shield electrodes 4a and 4b. It is therefore possible to provide a liquid crystal display panel 1 which can carry out a display with higher quality.

As early described, the shield electrodes 4a and 4b are formed by extending the storage capacitor counter line 4 in the respective notch parts 7a and 7b. This allows the liquid crystal display panel 1 to have a high aperture ratio.

Note that, according to the Embodiment 1, each of the picture element electrodes 7 in a corresponding one of the picture elements P (P(n, n+1), P(n, n), and so forth) has two notch parts, i.e., notch parts 7a and 7b. Note, however, that the number of the notch part(s) is not limited to this, and a shape of each notch part is not limited to a particular one. It is therefore possible to arbitrarily determine the number of the notch part(s) and a shape of each notch part.

In a case of focusing attention on the picture element P(n, n) shown in FIG. 1, a scanning signal line GLn+1 and a picture element electrode 7, which is electrically connected with a scanning signal line GLn via a TFT element 18, overlap each other when viewed from above. Note, however, that Embodiment 1 is not limited to this. For example, the scanning signal line GLn and the picture element electrode 7, which is electrically connected with the scanning signal line GLn via the TFT element 18, can overlap each other when viewed from above.

Alternatively, a configuration can be employed in which shield electrodes 4a and 4b, which are at least partially not covered with a picture element electrode 7, (i) are formed in a layer, in the array substrate 9, other than a layer in which the data signal lines SL (SLn, SLn+1, and so forth) are formed and (ii) are used as an alignment pattern during an alignment measurement.

Each of the scanning signal lines GL (GLn, GLn+1, and so forth)), the storage capacitor lines CS (CSn, CSn+1, and so forth), the data signal lines SL (SLn, SLn+1, and so forth), and the storage capacitor counter lines 4 can be formed by the use of (i) an element selected from the group consisting of at least Mo, Ta, W, Ti, Al, Cu, Cr, and Nd or (ii) an alloy material or compound material which mainly contains such an element. Note, however, that the present invention is not limited to this.

The picture element electrode 7 can be made of an electrically conductive material such as ITO (Indium Tin Oxide) or IZO (Indium Zinc Oxide). Note, however, that the present invention is not limited to this.

In Embodiment 1, an inorganic insulating film is employed as the gate insulating film 3, and a photosensitive organic insulating film is employed as the interlayer insulating film 5. Note, however, that the present invention is not limited to this.

It is preferable that the interlayer insulating film 5 is thick and has a low dielectric constant. Specifically, it is preferable that the interlayer insulating film 5 has a thickness of, for example, 1 μm to 3 μm and has a dielectric constant of, for example, 2 to 5. Note, however, that the present invention is not limited to this.

According to the liquid crystal display panel 1, the picture element electrode 7 is formed, via the interlayer insulating film 5, on a layer in which the data signal lines SL (SLn, SLn+1, and so forth) are formed. It follows that the interlayer insulating film 5 also serves as a shield layer for suppressing an orientation disorder due to an electric field caused by the scanning signal line GL (GLn, GLn+1, and so forth). It is therefore possible to provide a liquid crystal display panel 1 which has a wide viewing angle characteristic and can carry out a high quality display.

[Embodiment 2]

Figure 4:
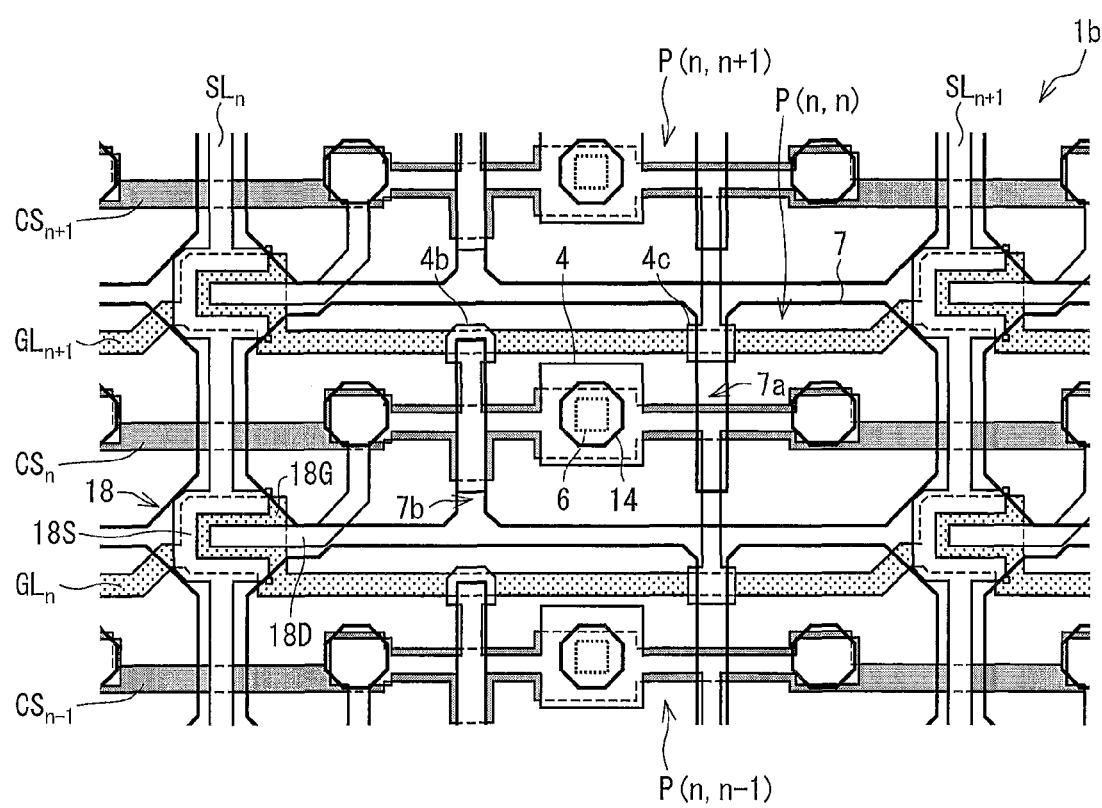
FIG. 4
Figure 5:
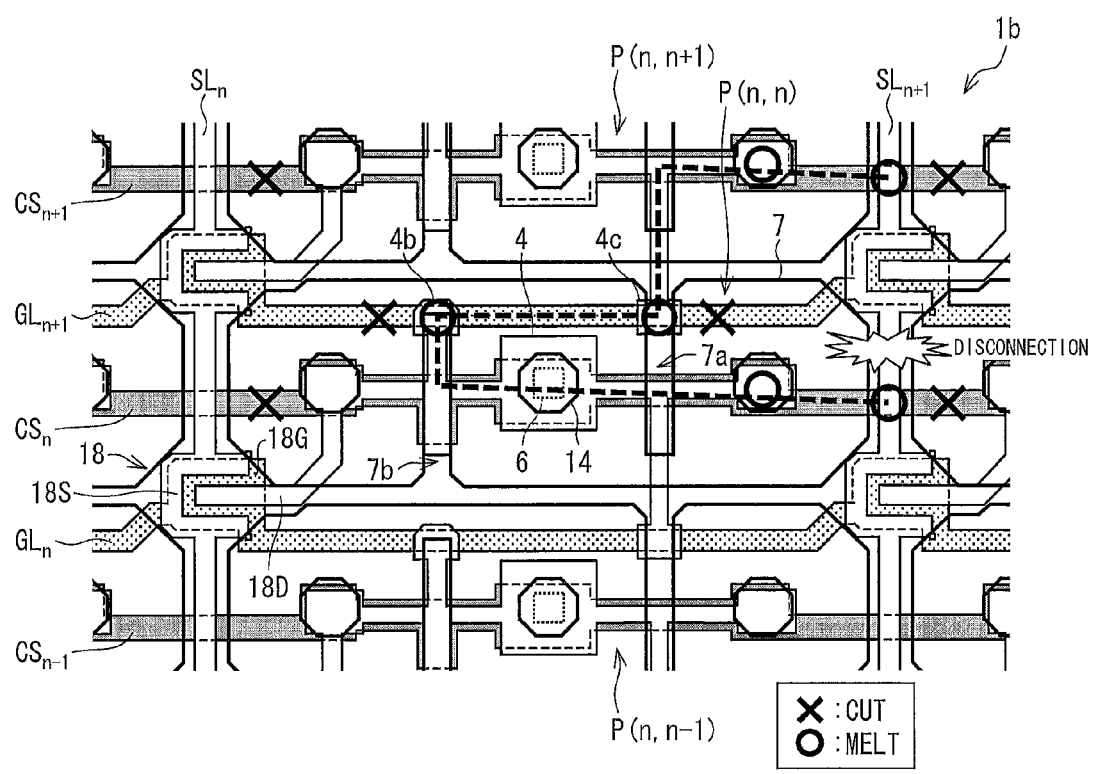
FIG. 5
Figure 13:
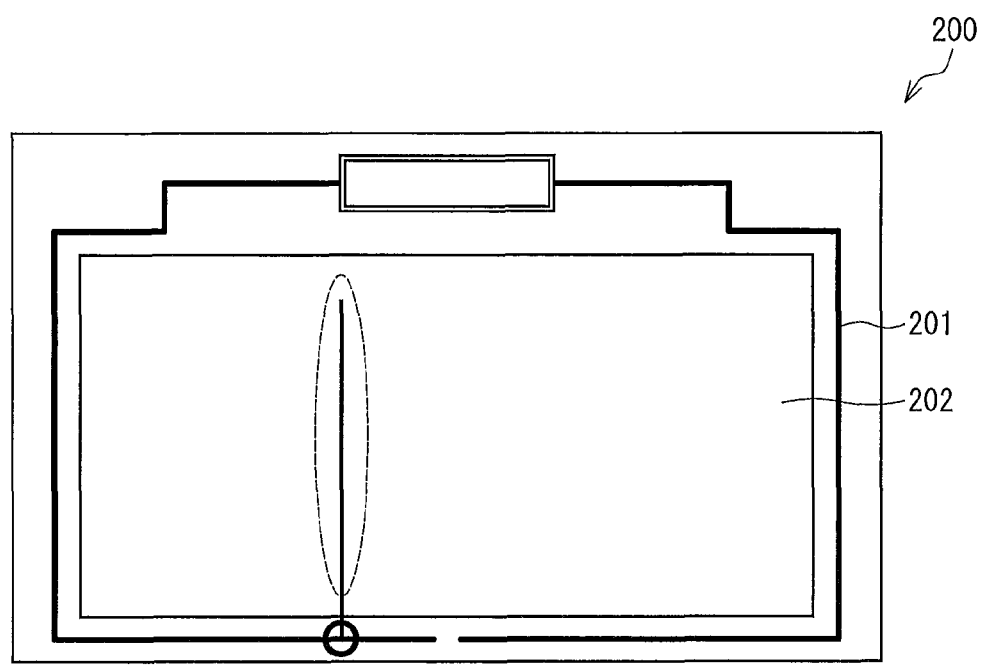
FIG. 13

The following description will discuss Embodiment 2 of the present invention, with reference to FIGS. 4, 5, and 13. Embodiment 2 is different from Embodiment 1 in that a shield electrode 4c is extended from one of storage capacitor counter lines 4 of picture elements adjacent to each other in a direction in which data signal lines SL (SLn, SLn+1, and so forth) extend. The other configurations of Embodiment 2 are identical with those of Embodiment 1. For convenience, identical reference numerals are given to constituent members having functions identical with those of the constituent members illustrated in the drawings of Embodiment 1, and descriptions of such constituent members are omitted here.

FIG. 4 is a plane view illustrating a schematic shape of a picture element section in a liquid crystal display panel 1b of Embodiment 2.

Note that, also in FIG. 4, each picture element electrode 7 is not depicted in view of a stacking pattern of constituent members.

According to the liquid crystal display panel 1b of Embodiment 2, a shield electrode 4c of a picture element is extended from a storage capacitor counter line 4 of any one of adjacent picture elements, which are adjacent to the picture element in a direction in which data signal lines SL (SLn, SLn+1, and so forth) extend. In the configuration illustrated in FIG. 4, a shield electrode 4c of a picture element P(n, n) is extended from a storage capacitor counter line 4 of a picture element P(n, n+1), which is adjacent to the picture element P(n, n) in an up-and-down direction in FIG. 4.

That is, the shield electrode 4c of the picture element P(n, n) is formed by extending the storage capacitor counter line 4 of the picture element P(n, n+1), which is one of adjacent picture elements adjacent to the picture element P(n, n) in the direction in which the data signal lines SL extend (see FIG. 4).

With the configuration, in a case where there occurs a disconnection part (defective part) in part of a data signal line SL of the liquid crystal display panel 1b in a liquid crystal display panel in which two scanning signal line driving circuits are provided so as to supply identical scanning signals via respective scanning signal lines GL (GLn, GLn+1, and so forth), the shield electrode 4c, that is extended from the storage capacitor counter line 4 in the picture element P(n, n+1) which is one of the picture elements adjacent to each other, can be used in place of the part of the data signal line SL in which part the disconnection is caused.

FIG. 5 is an explanatory view for explaining how to repair a disconnection part (defective part), which is caused in part of the data signal line SLn+1 of the liquid crystal display panel 1b, by the use of the shield electrode 4c.

In FIG. 5, circled parts indicate parts in each of which an electrical connection is made by a laser beam, and, in each of parts indicated by "X", an electrical disconnection is made by a laser beam.

The disconnection part (defective part) caused in the part of the data signal line SLn+1 is repaired by the use of (i) the shield electrode 4c in the picture element P(n, n), (ii) the scanning signal line GLn+1, (iii) storage capacitor lines CSn and CSn+1, (iv) the data signal line SLn+1, and (v) storage capacitor counter lines 4 (see FIG. 5).

A dotted line in FIG. 5 indicates an alternate path through which a data signal is supplied while avoiding the disconnection part (defective part) caused in the part of the data signal line SLn+1. Specifically, the data signal is supplied, via the storage capacitor line CSn, the storage capacitor counter line 4 of the picture element P(n, n), the scanning signal line GLn+1, the shield electrode 4c, the storage capacitor counter line 4 of the picture element P(n, n+1), and the storage capacitor line CSn+1.

With the configuration, a disconnection part of a data signal line SL can be repaired by the use of a shield electrode 4c and lines located in picture elements P. It is therefore possible to suppress influence of a signal delay, as compared with a conventional configuration in which an auxiliary wire 201 for repairing is provided outside of a display area 202 in which a plurality of picture elements are arranged (see FIG. 13).

According to the liquid crystal display panel 1b, even a repaired data signal line SLn+1 can secure a charging rate equivalent to that of a normal data signal line SL which has not been repaired. No difference in luminance was observed between (i) a picture element electrically connected with the repaired data signal line SLn+1 and (ii) a picture element electrically connected with the normal data signal line SL. It is therefore possible to provide a liquid crystal display panel 1b which can carry out a high quality display.

Note that it is necessary that the liquid crystal display panel 1b have two scanning signal line driving circuits, which are provided on both sides of the scanning signal lines GL so as to sequentially supply identical scanning signals via the respective scanning signal lines GL. This is because the scanning signal line(s) GL has a disconnection part(s) in a case where the repairing of such a disconnection part(s) is made by electrically connecting or disconnecting the scanning signal line(s) GL by use of laser beams.

In Embodiment 2, the two scanning signal line driving circuits and the liquid crystal display panel 1b are provided monolithically by utilizing a gate driver monolithic (GDM) technique. Note, however, that the present invention is not limited to this, and the scanning signal line driving circuits can be provided outside of the liquid crystal display panel 1b.

According to a conventional liquid crystal display panel such as those of a large size, of high definition, or of a triple scanning structure (in which one (1) pixel is formed by arranging, in a direction in which the data signal lines extend, landscape picture elements), a time period during which each picture element is charged is short and a load (resistance, capacitance) of a panel is large. As such, in a case where an auxiliary wire for repairing is provided outside of a display area, a yield rate has been reduced because it is sometimes impossible to carry out a repairing due to a cause such as a signal delay.

On the other hand, according to the configuration of Embodiment 2, a data signal line can be repaired without suffering (i) a signal delay and (ii) a load (resistance, capacitance) of the panel. It is therefore possible to form data signal lines each having a further thinner width. This allows the liquid crystal display panel 1b to have a higher transmittance. Moreover, it is also possible to reduce a frame area of the liquid crystal display panel 1b because, unlike the conventional art, an auxiliary wire for repairing does not need to be provided outside of the display area.

[Embodiment 3]

Figure 6:
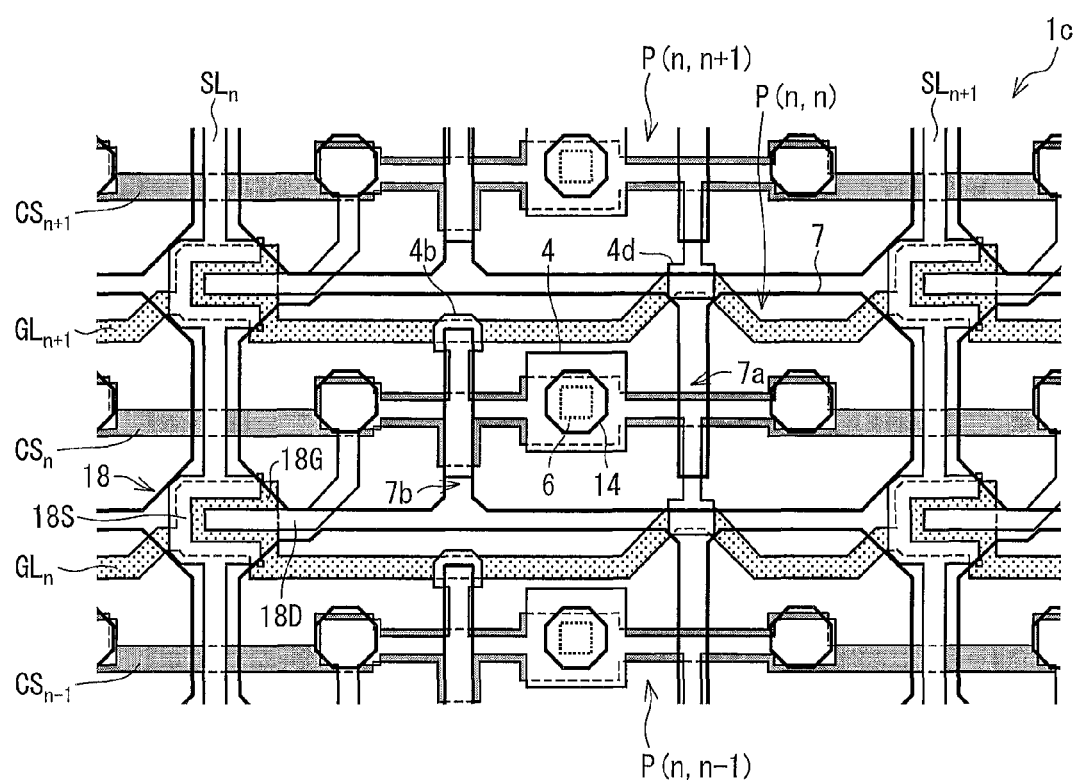
FIG. 6
Figure 7:
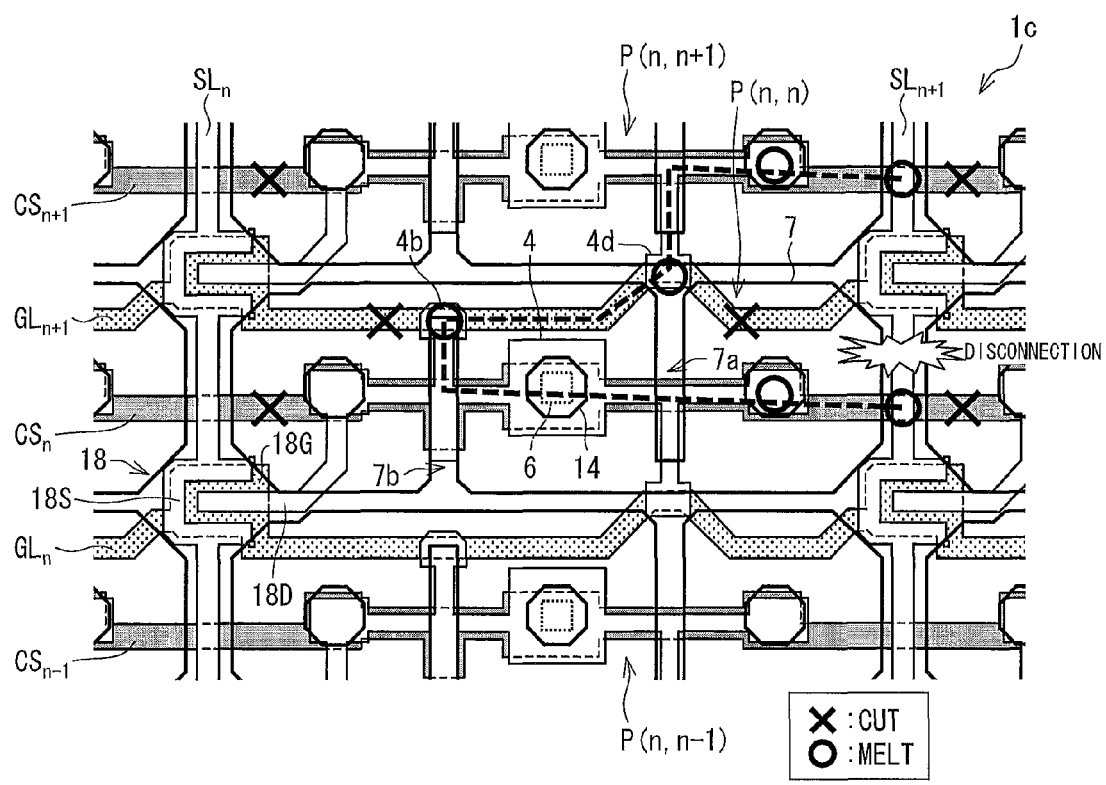
FIG. 7

The following description will discuss Embodiment 3 of the present invention, with reference to FIGS. 6 and 7. Embodiment 3 is different from Embodiments 1 and 2 in that (i) each of scanning signal lines GL (GLn, GLn+1, and so forth) is bent so that the scanning signal line GL and at least one of notch parts 7a and 7b of each picture element electrode 7 do not overlap each other when viewed from above and (ii) a shield electrode 4d and a part of a scanning signal line GL, which part is located at a boundary between two picture elements, at least partially overlap each other when viewed from above. Note that (i) the two picture elements are adjacent to each other in a direction in which data signal lines SL (SLn, SLn+1, and so forth) extend and (ii) the shield electrode 4d is formed by extending a storage capacitor counter line 4 of one of the two picture elements. The other configurations of Embodiment 3 are identical with those of Embodiment 1. For convenience, identical reference numerals are given to constituent members having functions identical with those of the constituent members illustrated in the drawings of Embodiments 1 and 2, and descriptions of such constituent members are omitted here.

FIG. 6 is a plane view illustrating a schematic shape of a picture element section in a liquid crystal display panel 1c of Embodiment 3.

Note that, also in FIG. 6, each picture element electrode 7 is not depicted in view of a stacking order of constituent members.

According to the liquid crystal display panel 1c, each of scanning signal lines GL (GLn, GLn+1, and so forth) is bent so that each of the scanning signal lines GL and a notch part 7a of each picture element electrode 7 do not overlap each other when viewed from above (see FIG. 6). For example, (i) the scanning signal line GLn+1 is bent such that a part of the scanning signal line GLn+1 is located at a boundary between a picture element P(n, n) and a picture element P(n, n+1) which are adjacent to each other in a direction (an up-and-down direction in FIG. 6) in which data signal lines SL (SLn, SLn+1, and so forth) extend and (ii) the part of the scanning signal line GLn+1 and a shield electrode 4d, which is extended from a storage capacitor counter line 4 of the picture element P(n, n+1), at least partially overlap each other when viewed from above (see FIG. 6).

This allows a reduction in area in which the shield electrode 4d and a picture element electrode 7 overlap each other, when viewed from above. It is therefore possible to suppress influence, for example, on a picture element electrode 7 of the picture element P(n, n), which influence is exerted by an electric potential of the shield electrode 4d extended from the storage capacitor counter line 4 of the picture element P(n, n+1), which is adjacent to the picture element P(n, n). In other words, it is possible to suppress influence exerted, via the shield electrode 4d, on the picture element electrode 7 of the picture element P(n, n) in which a given electric potential is held.

This allows the liquid crystal display panel 1c to carry out a display with higher quality.

FIG. 7 is an explanatory view for explaining how to repair a disconnection part (defective part), which is caused in part of the data signal line SLn+1 of the liquid crystal display panel 1c, by the use of the shield electrode 4d.

In FIG. 7, circled parts indicate parts in each of which an electrical connection is made by a laser beam, and, in each of parts indicated by "X", an electrical disconnection is made by a laser beam.

The disconnection part (defective part) caused in the part of the data signal line SLn+1 is repaired by the use of (i) the shield electrode 4d provided between the picture element P(n, n+1) and the picture element P(n, n), (ii) the scanning signal line GLn+1 which is bent so that the scanning signal line GLn+1 and the notch part 7a do not overlap each other when viewed from above, (iii) storage capacitor lines CSn and CSn+1, (iv) the data signal line SLn+1, and (v) storage capacitor counter lines 4 (see FIG. 7).

A dotted line in FIG. 7 indicates an alternate path through which a data signal is supplied while avoiding the disconnection part (defective part) caused in the part of the data signal line SLn+1. Specifically, the data signal is supplied via the storage capacitor line CSn, the storage capacitor counter line 4 of the picture element P(n, n), the shield electrode 4b, the scanning signal line GLn+1, the shield electrode 4d, the storage capacitor counter line 4 of the picture element P(n, n+1), and the storage capacitor line CSn+1.

With the configuration, a disconnection part of a data signal line SL can be repaired by the use of a shield electrode 4d and lines located in picture elements P. It is therefore possible to suppress influence of a signal delay, as compared with a conventional configuration in which an auxiliary wire 201 for repairing is provided outside of a display area 202 in which a plurality of picture elements are arranged (see FIG. 13).

According to the liquid crystal display panel 1c, even a repaired data signal line SLn+1 can secure a charging rate equivalent to that of a normal data signal line SL which has not been repaired. No difference in luminance was observed between (i) a picture element electrically connected with the repaired data signal line SLn+1 and (ii) a picture element electrically connected with the normal data signal line SL. It is therefore possible to provide a liquid crystal display panel 1c which can carry out a high quality display.

Note that it is necessary that the liquid crystal display panel 1c also have two scanning signal line driving circuits, which are provided on both sides of the scanning signal lines GL so as to supply identical scanning signals via the respective scanning signal lines GL. This is because the scanning signal line(s) GL has a disconnection part(s) in a case where the repairing of such a disconnection part(s) is made by electrically connecting or disconnecting the scanning signal line(s) GL by use of laser beams.

[Embodiment 4]

Figure 8:
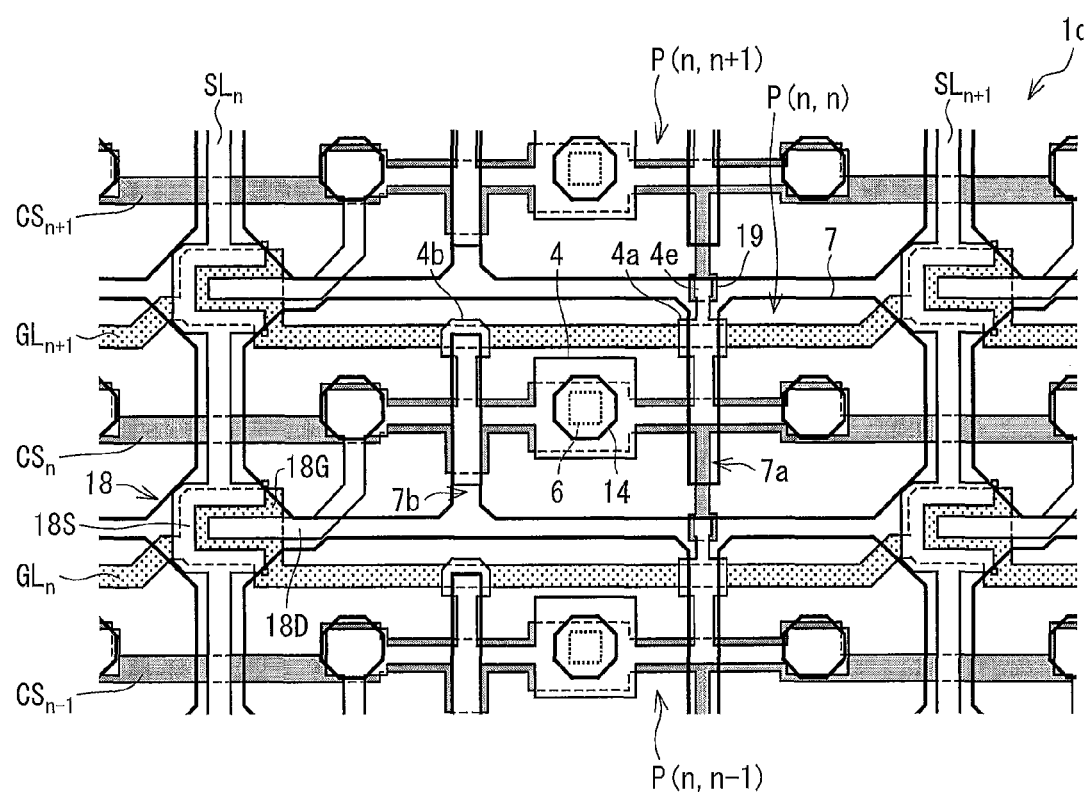
FIG. 8
Figure 9:
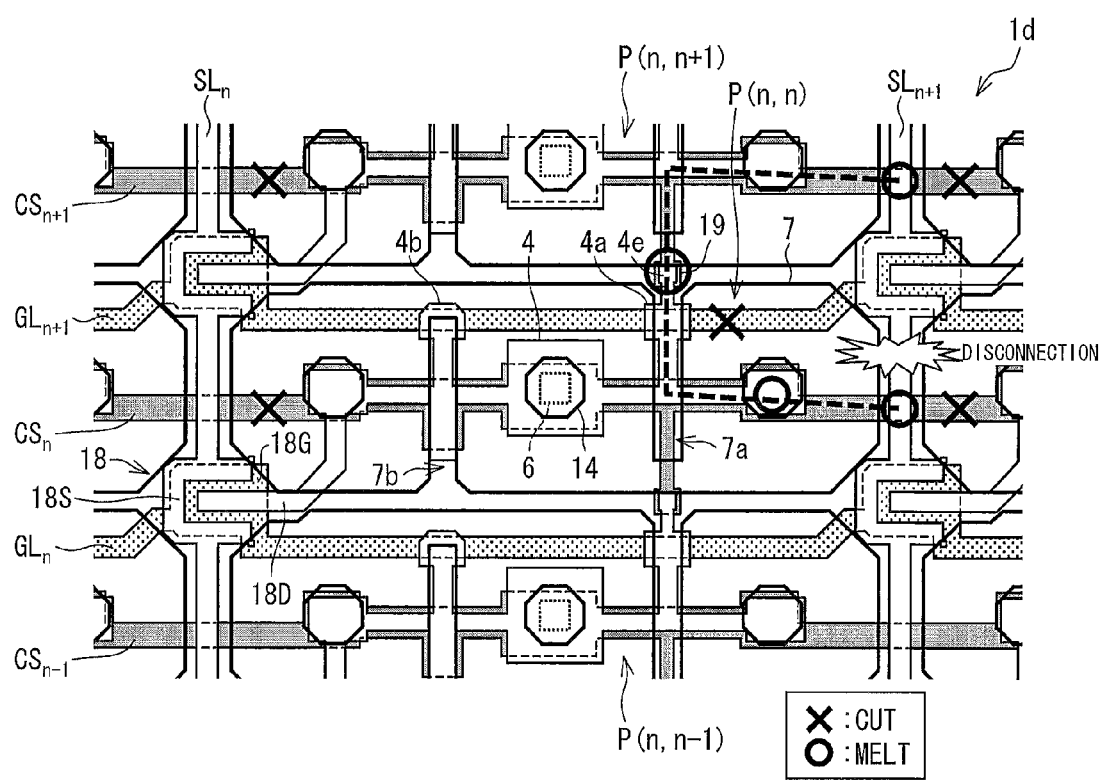
FIG. 9

The following description will discuss Embodiment 4 of the present invention, with reference to FIGS. 8 and 9. Embodiment 4 is different from Embodiments 1 through 3 in that (i) an electrode 4e, which is extended from a storage capacitor counter line 4 of a picture element via a shield electrode 4a, is formed at a boundary between the picture element and an adjacent picture element, which are adjacent to each other in a direction in which data signal lines SL (SLn, SLn+1, and so forth) extend and (ii) a counter electrode 19, which is extended from a storage capacitor line CS extending across the adjacent picture element, is provided so that the electrode 4e and the counter electrode 19 at least partially overlap each other when viewed from above. The other configurations of Embodiment 4 are identical with those of Embodiments 1 through 3. For convenience, identical reference numerals are given to constituent members having functions identical with those of the constituent members illustrated in the drawings of Embodiments 1 through 3, and descriptions of such constituent members are omitted here.

FIG. 8 is a plane view illustrating a schematic shape of a picture element section in a liquid crystal display panel 1d of Embodiment 4.

Note that, also in FIG. 8, each picture element electrode 7 is not depicted in view of a stacking order of constituent members.

According to Embodiment 4, (i) an electrode 4e, which is extended from a storage capacitor counter line 4 of a picture element P(n, n) via a shield electrode 4a, is formed (a) in a layer in which data signal lines SL (SLn, SLn+1, and so forth) and the storage capacitor counter line 4 are formed and (b) at a boundary between the picture element P(n, n) and a picture element P(n, n+1), which are adjacent to each other in a direction (an up-and-down direction in FIG. 8) in which the data signal lines SL extend and (ii) a counter electrode 19 is formed so that the electrode 4e and the counter electrode 19 at least partially overlap each other when viewed from above (see FIG. 8). Note that the counter electrode 19 is extended from a storage capacitor line CSn+1 which (a) extends across the picture element P(n, n+1) and (b) is formed in a layer in which scanning signal lines GL (GLn, GLn+1, and so forth) are formed (see FIG. 8).

FIG. 9 is an explanatory view for explaining how to repair a disconnection part (defective part), which is caused in part of the data signal line SLn+1 of the liquid crystal display panel 1d, by the use of the electrode 4e and the counter electrode 19 which are formed at the boundary between the picture elements P(n, n+1) and P(n, n).

In FIG. 9, circled parts indicate parts in each of which an electrical connection is made by a laser beam, and, in each of parts indicated by "X", an electrical disconnection is made by a laser beam.

The disconnection part (defective part) caused in the part of the data signal line SLn+1 is repaired by the use of (i) the electrode 4e formed at the boundary between the picture element P(n, n+1) and the picture element P(n, n), (ii) the counter electrode 19, (iii) storage capacitor lines CSn and CSn+1, (iv) the data signal line SLn+1, and (v) storage capacitor counter lines 4 (see FIG. 9).

A dotted line in FIG. 9 indicates an alternate path through which a data signal is supplied while avoiding the disconnection part (defective part) caused in the part of the data signal line SLn+1. Specifically, the data signal is supplied via the storage capacitor line CSn, the storage capacitor counter line 4 of the picture element P(n, n), the shield electrode 4e, the counter electrode 19, and the storage capacitor line CSn+1.

With the configuration, a disconnection part of a data signal line SL can be repaired by the use of (i) an electrode 4e, (ii) a counter electrode 19 partially facing the electrode 4e, and (iii) lines (except for a scanning signal line GL) located in picture elements P. It is therefore possible to suppress influence of a signal delay, as compared with a conventional configuration in which an auxiliary wire 201 for repairing is provided outside of a display area 202 in which a plurality of picture elements are arranged (see FIG. 13).

According to the liquid crystal display panel 1d, even a repaired data signal line SLn+1 can secure a charging rate equivalent to that of a normal data signal line SL which has not been repaired. No difference in luminance was observed between (i) a picture element electrically connected with the repaired data signal line SLn+1 and (ii) a picture element electrically connected with the normal data signal line SL. It is therefore possible to provide a liquid crystal display panel 1d which can carry out a high quality display.

According to the liquid crystal display panel 1d, a disconnection part (defective part) of a data signal line SL can be repaired without using a scanning signal line GL. It is therefore unnecessary to provide two scanning signal line driving circuits for supplying identical scanning signals via the respective scanning signal lines GL (GLn, GLn+1, and so forth) from both ends of the scanning signal lines GL.

This allows the liquid crystal display panel 1d (i) to have a reduced frame area and (ii) to carry out a high quality display.

It is also possible to reduce repairing time and errors in repairing, since a disconnection part (defective part) caused on a data signal line SL is repaired without using a scanning signal line GL.

[Embodiment 5]

Figure 10:
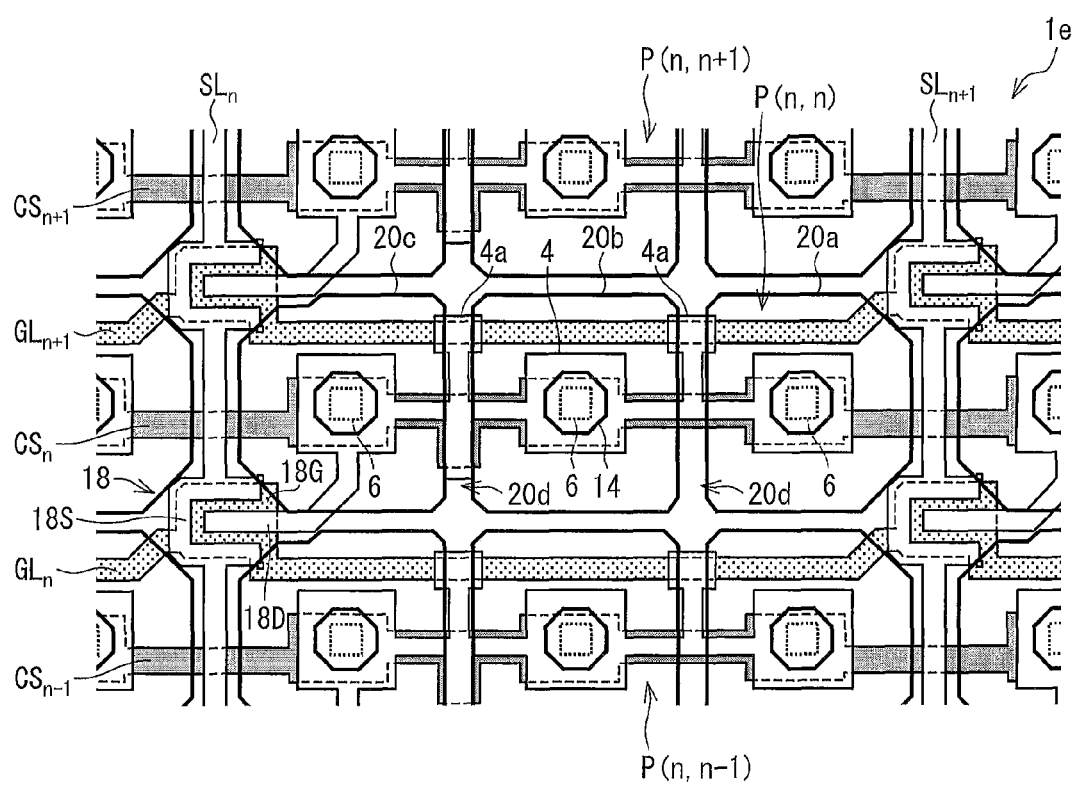
FIG. 10
Figure 11:
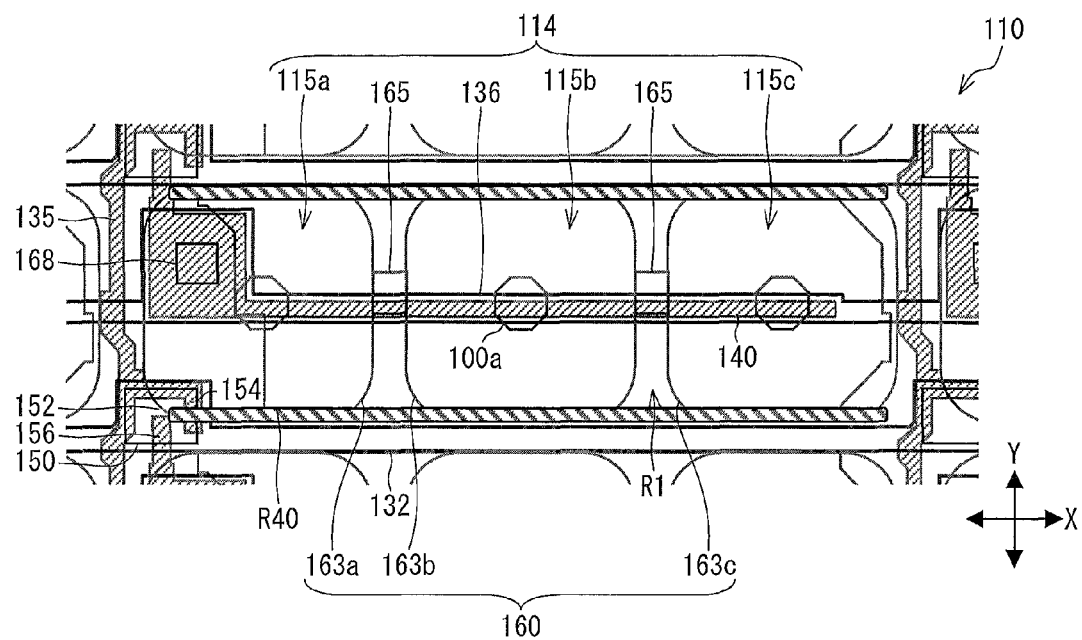
FIG. 11
Figure 12:
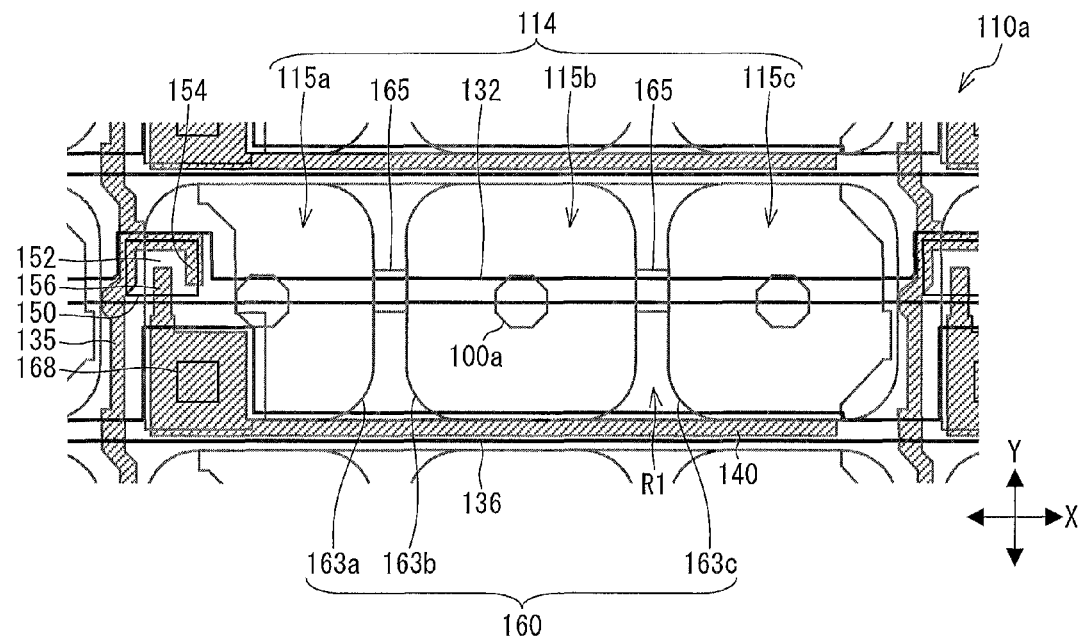
FIG. 12

The following description will discuss Embodiment 5 of the present invention, with reference to FIG. 10. Embodiment 5 is different from Embodiments 1 through 4 in that (i) sub-picture-element electrodes 20a, 20b, and 20c, which are electrically separated from each other by notch parts 20d, are provided in each of picture elements P (P(n, n+1), P(n, n), and so forth) and (ii) the sub-picture-element electrodes 20a, 20b, and 20c are electrically connected with a drain electrode 18D of a transistor element 18 provided for a corresponding one of the picture elements P. The other configurations of Embodiment 5 are identical with those of Embodiments 1 through 4. For convenience, identical reference numerals are given to constituent members having functions identical with those of the constituent members illustrated in the drawings of Embodiments 1 through 4, and descriptions of such constituent members are omitted here.

FIG. 10 is a plane view illustrating a schematic shape of a picture element section of a liquid crystal display panel 1e in accordance with Embodiment 5, in which picture element section sub-picture-element electrodes 20a, 20b, and 20c are provided.

Note that, also in FIG. 10, each of the sub-picture-element electrodes 20a, 20b, and 20c is not depicted in view of a stacking order of constituent members.

According to the liquid crystal display panel 1e, a picture element electrode, which is provided for each of the picture elements P (P(n, n+1), P(n, n), and so forth), is made up of sub-picture-element electrodes 20a, 20b, and 20c which are electrically separated from each other by notch parts 20d (see FIG. 10).

According to the configuration, the sub-picture-element electrodes 20a, 20b, and 20c are electrically connected, via respective contact holes 6 formed in an interlayer insulating film 5, with a storage capacitor counter line 4 electrically connected with the drain electrode 18D. It is therefore unnecessary to provide a connection part between the respective sub-picture-element electrodes 20a, 20b, and 20c, unlike Embodiments 1 through 4.

It is known that such a connection part causes adverse impacts, such as an afterimage and a low response speed, on a liquid crystal display panel. However, according to the liquid crystal display panel 1e of Embodiment 5, an afterimage and a response speed are improved, since it is not necessary to provide a connection part between the respective sub-picture-element electrodes 20a, 20b, and 20c.

According to Embodiment 5, no connection part is provided in each of the notch parts 20d. Under the circumstances, parts of a scanning signal line GL, which parts are not covered with the sub-picture-element electrodes 20a, 20b, and 20c, are covered with respective shield electrodes 4a which are formed in a layer in which data signal lines SL (SLn, SLn+1, and so forth) and the storage capacitor counter line 4 are formed (see FIG. 10).

According to Embodiment 5, the sub-picture-element electrodes 20a, 20b, and 20c, which are electrically separated from each other, are provided for each of the picture elements P (P(n, n+1), P(n, n), and so forth). Note, however, that Embodiment 5 is not limited to this. For example, a connection part can be provided only between the sub-picture-element electrodes 20a and 20b so that (i) only the sub-picture-element electrodes 20a and 20b are electrically connected with each other and (ii) the sub-picture-element electrode 20c is electrically separated from the sub-picture-element electrodes 20a and 20b.

In such a case, it is possible to reduce the required number of contact holes 6 to two in each of the picture elements P (P(n, n+1), P(n, n), and so forth). This makes it possible to provide a liquid crystal display panel having a high transmittance.

On the other hand, according to the configuration of the liquid crystal display panel 1e illustrated in FIG. 10, the required number of the contact holes 6 in each of the picture elements P (P(n, n+1), P(n, n), and so forth) is three. Under the circumstances, although the transmittance is lower than the configuration in which less contact holes 6 are provided, the liquid crystal display panel 1e has improved quality in view of response speed and afterimage.

According to Embodiment 5, a shield electrode 4a in the picture element P(n, n) is extended from the storage capacitor counter line 4 of the picture element P(n, n) (see FIG. 10). Note, however, that Embodiment 5 is not limited to this, and the shield electrode 4a in the picture element P(n, n) can be extended from a storage capacitor counter line 4 of any one of picture elements P(n, n+1) and P(n, n−1), which are adjacent to the picture element P(n, n) in a direction (an up-and-down direction in FIG. 10) in which the data signal lines SL (SLn, SLn+1, and so forth) extend.

With such a configuration, it is possible to repair a disconnection part (defective part), which is caused in a part of a data signal line SL, with the use of the shield electrode 4a extended from the storage capacitor counter line 4 of any one of the picture elements P(n, n+1) and P(n, n−1).

According to the liquid crystal display panel of the present invention, it is preferable that the corresponding one of the plurality of picture element electrodes is electrically divided into a plurality of sub-picture-element electrodes by the notch part; and the plurality of sub-picture-element electrodes are electrically connected with a drain electrode of a corresponding one of the plurality of transistor elements which is provided in a corresponding one of the plurality of picture elements.

According to the configuration, each of the plurality of picture element electrodes is made up of the plurality of sub-picture-element electrodes electrically separated from each other by the notch part(s).

Since the plurality of sub-picture-element electrodes are connected with the drain electrode of the transistor element which is provided for the corresponding one of the plurality of picture elements, it is not necessary to provide a connection part between the respective plurality of sub-picture-element electrodes.

It is known that such a connection part, which is provided between respective sub-picture-element electrodes, causes adverse impacts, such as an afterimage and a low response speed, on a liquid crystal display panel. However, according to the liquid crystal display panel of the present invention, an afterimage and a response speed are improved, since it is not necessary to provide a connection part between the respective plurality of sub-picture-element electrodes.

According to the liquid crystal display panel of the present invention, it is preferable that the shield electrode is electrically connected with the drain electrode of the corresponding one of the plurality of transistor elements.

According to the configuration, the shield electrode is electrically connected with the drain electrode of the transistor element which is connected with a picture element electrode or a plurality of sub-picture-element electrodes provided in the corresponding one of the plurality of picture elements. With the configuration, a signal supplied to the picture element electrode or the plurality of sub-picture-element electrodes can be supplied also to the shield electrode. It is therefore possible to provide a liquid crystal display panel which can carry out a display with higher quality.

According to the liquid crystal display panel of the present invention, it is preferable that the corresponding one of the plurality of picture element electrodes is formed so as to have a length in a direction where the corresponding one of the scanning signal lines extends, the length being longer than a length in a direction where the data signal lines extend.

In a liquid crystal display panel having laterally-long picture elements as in the configuration of the present invention, a scanning signal line accounts for a large area of each picture element. Under the circumstances, the configuration, in which the shield electrode is formed in a layer in which the picture element electrodes and the data signal lines are formed, effectively suppress an orientation disorder of liquid crystal molecules caused by an electric field generated by the scanning signal line.

For example, in a case where one (1) pixel is made up of the laterally-long picture elements juxtaposed to each other in a direction in which the data signal lines extend, it is possible to reduce the number of data signal lines, as compared with a configuration in which one (1) pixel is made up of longitudinally-long picture elements juxtaposed to each other in a direction in which the scanning signal lines extend. In general, a data signal line driving circuit consumes more electric power and costs higher in manufacturing, as compared to a scanning signal line driving circuit. Therefore, it is possible to reduce power consumption and manufacturing cost of the data signal line driving circuit by reducing the number of data signal lines.

According to the liquid crystal display panel of the present invention, it is preferable that the corresponding one of the plurality of picture element electrodes is cut out such that (i) part of the corresponding one of the scanning signal lines in at least one notch part and (ii) the corresponding one of the plurality of picture element electrodes overlap each other when viewed from above.

According to the configuration, the notch part is formed such that the part of the scanning signal line in the notch part and the picture element electrode overlap each other when viewed from above.

With the configuration, since (i) the part of the scanning signal line in the notch part and (ii) the picture element electrode overlap each other when viewed from above, it is possible to make smaller, by the partial overlapping of the above (i) and (ii), an area of the shield electrode which is formed in a layer where the data signal lines are formed.

This allows a reduction in parasitic capacitance caused by the shield electrode and the scanning signal line.

According to the liquid crystal display panel of the present invention, it is preferable that, in the region of the each of the picture elements in which region the corresponding one of the plurality of picture element electrodes is formed, when viewed from above, (i) the corresponding one of the plurality of picture element electrodes and a storage capacitor line overlap each other and (ii) the corresponding one of the plurality of picture element electrodes and a storage capacitor counter line overlap each other; the storage capacitor line is formed, in the layer in which the scanning signal lines are formed, so as to extend in a direction in which the scanning signal lines extend; the storage capacitor counter line is formed, via a first insulating layer, in the layer in which the data signal lines are formed so that the storage capacitor counter line and the storage capacitor line overlap each other at least in the notch part, when viewed from above.

According to the configuration, when viewed from above, the storage capacitor line, which is formed in the layer in which the scanning signal lines are formed, and the storage capacitor counter line, which is formed in the layer in which the data signal lines are formed, overlap each other via the first insulating layer at least in the notch part.

With the configuration, a storage capacitor defined by the storage capacitor line, the first insulating layer, and the storage capacitor counter line can be secured in each of the notch parts, i.e., a non-opening part of the picture element. In the region where the picture electrode is formed in the picture element (i.e., opening part of the picture element), it is therefore possible to reduce an area where the storage capacitor line and the storage capacitor counter line are formed, because the storage capacitor can be secured by the notch parts.

With the configuration, it is therefore possible to provide a liquid crystal display panel having a high aperture ratio.

According to the liquid crystal display panel of the present invention, it is preferable that, in a case where the drain electrode is formed with respect to the corresponding one of the scanning signal lines, including a gate electrode of the transistor element, so as to be deviated from a design value, the design value causes (i) the drain electrode to overlap, when viewed from above, with the corresponding one of the scanning signal lines while being deviated in a certain direction and (ii) part of the storage capacitor counter line to overlap, when viewed from above, with part of the storage capacitor line while being deviated in the certain direction so that an area of a region where the storage capacitor line and the storage capacitor counter line overlap each other when viewed from above is adjusted in accordance with an area of a region where the corresponding one of the scanning signal lines and the drain electrode overlap each other when viewed from above.

According to the liquid crystal display panel, it is known that an electric potential of the picture element (the picture element electrode) is reduced when the transistor element is turned OFF (i.e., a scanning signal is in a non-active state) due to a parasitic capacitance Cgd caused by the drain electrode (and the picture element electrode electrically connected with the drain electrode) and the scanning signal line. A reduction (absolute value) in electric potential is called a "feed-through voltage" ($\Delta V$). In this situation, an effective electric potential ($S-\Delta V$) is applied to the picture element, where "S" indicates a signal electric potential to be supplied to the picture element. Note that the feed-through voltage $\Delta V$ is equal to $Cgd \times (VH-VL)/(Ccs+Csd+Cgd+Clc)$, where (i) "VH" indicates an active electric potential of a scanning signal to be supplied via the scanning signal line, (ii) "VL" indicates a non-active electric potential of the scanning signal, (iii) "Clc" indicates a liquid crystal capacitance, (iv) "Ccs" is a storage capacitance, and (v) "Csd" is a parasitic capacitance between the data signal line and the drain electrode (and the picture element electrode electrically connected with the drain electrode).

With the configuration, even in a case where a wiring pattern is formed while deviated from intended design, a feed-through voltage caused by a variation in parasitic capacitance Cgd are alleviated by a variation in storage capacitance Ccs.

For example, in a case where a designed wiring pattern is such that, when viewed from above, (i) the drain electrode crosses the gate electrode and extends rightward and (ii) part of the storage capacitor counter line also crosses part of the storage capacitor line and extends rightward, the drain electrode is displaced with respect to the gate electrode as follows, if the designed wiring pattern is not formed as designed.

In a case where the drain electrode and the gate electrode are formed such that the drain electrode is displaced rightward with respect to the gate electrode, an area is reduced in which the drain electrode and the gate electrode overlap each other when viewed from above. This causes a parasitic capacitance Cgd to be reduced, and therefore a feed-through voltage $\Delta V$ is also reduced in accordance with the formula above described. Meanwhile, an area is also reduced in which the storage capacitor line CS (formed in a layer in which the gate electrode is formed) and the storage capacitor counter line (formed in a layer in which the drain electrode is formed) partially overlap each other. This causes a storage capacitance Ccs to be reduced, and therefore a feed-through voltage $\Delta V$ increases in accordance with the formula above described. Consequently, the variation in feed-through voltage $\Delta V$ can be suppressed.

On the other hand, in a case where the drain electrode and the gate electrode are formed such that the drain electrode is displaced leftward with respect to the gate electrode, an area is increased in which the drain electrode and the gate electrode overlap each other when viewed from above. This causes a parasitic capacitance Cgd to increase, and therefore a feed-through voltage $\Delta V$ also increases in accordance with the formula above described. Meanwhile, an area is also increased in which the storage capacitor line (formed in a layer in which the gate electrode is formed) and a storage capacitor counter line (formed in a layer in which the drain electrode is formed) partially overlap each other. This causes storage capacitance Ccs increase, and therefore a feed-through voltage $\Delta V$ is reduced in accordance with the formula above described. Consequently, the variation in feed-through voltage $\Delta V$ can be suppressed.

According to the liquid crystal display panel of the present invention, it is preferable that the shield electrode is formed in the notch part by extending the storage capacitor counter line to the notch part.

According to the configuration, since the shield electrode is extended from the storage capacitor counter line that is electrically connected with the drain electrode of the transistor element, a signal supplied to the picture element electrode can be supplied also to the shield electrode. This allows the liquid crystal display panel to carry out a display with higher quality.

The shield electrode is provided, so as to be extended from the storage capacitor counter line, in the area in which the notch part is provided. This allows the liquid crystal display panel to have a high aperture ratio.

According to the liquid crystal display panel of the present invention, it is preferable that the shield electrode is formed by extending a storage capacitor counter line of one of adjacent picture elements in a direction in which the data signal lines extend.

According to the configuration, the shield electrode provided in the corresponding one of the plurality of picture elements is connected with the storage capacitor counter line provided in the one of the adjacent picture elements, which is adjacent to the corresponding one of the plurality of picture elements in the direction in which the data signal lines extend. This allows the liquid crystal display panel to have a wide viewing angle characteristic and to carry out a high quality display.

Moreover, in a case where (i) the liquid crystal display panel has two scanning signal line driving circuits for supplying identical scanning signals via a scanning signal line and (ii) a disconnection part (defective part) is caused in a part of a data signal line, the shield electrode can be used in place of the part of the data signal line in which part the disconnection is caused.

With the configuration, the disconnection part of the data signal line can be repaired by the use of the shield electrode located in the picture element. It is therefore possible to suppress influence of a signal delay, as compared with a conventional configuration in which an auxiliary wire for repairing is provided outside of a display area. Therefore, even a repaired data signal line can secure a charging rate equivalent to that of a normal data signal line which has not been repaired. No difference in luminance was observed between (i) a picture element electrically connected with the repaired data signal line and (ii) a picture element electrically connected with the normal data signal line. It is therefore possible to provide a liquid crystal display panel which can carry out a high quality display.

According to the liquid crystal display panel of the present invention, it is preferable that the corresponding one of the scanning signal lines is formed by being bent so that the corresponding one of the scanning signal lines and the at least one notch part do not overlap each other; and (i) part of the corresponding one of the scanning signal lines, which is formed at a boundary between (a) the one of adjacent picture elements in the direction in which the data signal lines extend and (b) the corresponding one of the plurality of picture elements, and (ii) the shield electrode, which is formed by extending the storage capacitor counter line of the one of adjacent picture elements, at least partially overlap each other when viewed from above.

According to the configuration, the scanning signal line, which extends through the corresponding one of the plurality of picture elements when viewed from above, is bent so that the scanning signal line and the notch part of the corresponding one of the plurality of picture elements do not overlap each other when viewed from above; and when viewed from above, the part of the scanning signal line, which part is located at the boundary between (a) the one of adjacent picture elements and (b) the corresponding one of the plurality of picture elements, and the shield electrode, which is extended from the storage capacitor counter line provided in the one of adjacent picture elements, at least partially overlap each other.

This allows a reduction in area in which the shield electrode and the picture element electrode overlap each other, when viewed from above. It is therefore possible to suppress influence on a picture element electrode of the corresponding picture element, which influence is exerted by an electric potential of the shield electrode extended from the storage capacitor counter line of the adjacent picture element, which is adjacent to the corresponding picture element. In other words, it is possible to suppress influence exerted, via the shield electrode, on the picture element electrode in which a given electric potential is held.

This allows the liquid crystal display panel to carry out a display with higher quality.

Moreover, in a case where (i) the liquid crystal display panel has two scanning signal line driving circuits for supplying identical scanning signals via a scanning signal line and (ii) a disconnection part (defective part) is caused in a part of a data signal line, the shield electrode can be used in place of the part of the data signal line in which part the disconnection is caused.

With the configuration, the disconnection part of the data signal line can be repaired by the use of the shield electrode located in the picture element. It is therefore possible to suppress influence of a signal delay, as compared with a conventional configuration in which an auxiliary wire for repairing is provided outside of a display area. Therefore, even a repaired data signal line can secure a charging rate equivalent to that of a normal data signal line which has not been repaired. No difference in luminance was observed between (i) a picture element electrically connected with the repaired data signal line and (ii) a picture element electrically connected with the normal data signal line. It is therefore possible to provide a liquid crystal display panel which can carry out a high quality display.

The liquid crystal display panel of the present invention preferably further includes two scanning signal line driving circuits, provided on both sides of the plurality of scanning signal lines, for sequentially supplying identical scanning signals from both ends of each of the scanning signal lines.

According to the configuration, the liquid crystal display panel and the two scanning signal line driving circuits are monolithically formed or the two scanning signal line driving circuits are provided outside of the liquid crystal display panel so that identical scanning signals can be supplied via a scanning signal line from both ends of the scanning signal line. Therefore, in a case where a disconnection part (defective part) is caused in a part of a data signal line, the shield electrode can be used in place of the part of the data signal line in which part the disconnection is caused.

According to the liquid crystal display panel of the present invention, it is preferable that the shield electrode is extended to a boundary between (a) one of adjacent picture elements in a direction in which the data signal lines extend and (b) the corresponding one of the plurality of picture elements; and (i) the shield electrode and (ii) a counter electrode of the shield electrode, which counter electrode is formed by extending a storage capacitor line of the one of the adjacent picture elements, at least partially overlap each other at the boundary when viewed from above.

According to the configuration, the shield electrode and the counter electrode, which is extended from the storage capacitor line of the adjacent picture element, at least partially overlap each other in an area in which the scanning signal line is not located when viewed from above, that is, at the boundary between the corresponding picture element and the adjacent picture element.

With the configuration, in a case where a disconnection part (defective part) is caused in a part of a data signal line, the disconnection part can be repaired by the use of the shield electrode and the counter electrode, without using the scanning signal line.

According to the liquid crystal display panel, a disconnection part (defective part) of a data signal line can be repaired without using the scanning signal line. It is therefore unnecessary to provide two scanning signal line driving circuits for supplying identical scanning signals via each the respective scanning signal lines from both ends of the scanning signal lines.

This allows the liquid crystal display panel (i) to have a reduced frame area and (ii) to carry out a high quality display.

It is also possible to reduce repairing time and errors in repairing, since a disconnection part (defective part) caused on a data signal line is repaired without using a scanning signal line.

According to the liquid crystal display panel of the present invention, it is preferable that the corresponding one of the scanning signal lines, formed so that the corresponding one of the scanning signal lines and the corresponding one of the plurality of picture element electrodes overlap each other when viewed from above, is electrically connected with a corresponding one of the plurality of transistor elements which is electrically connected with a picture element electrode formed in one of adjacent picture elements in a direction in which the data signal lines extend.

According to the configuration, the scanning signal line extending through the corresponding picture element is electrically connected with a picture element electrode or a plurality of sub-picture-element electrodes of the adjacent picture element via the transistor element.

According to the liquid crystal display panel of the present invention, it is preferable that the plurality of picture element electrodes are formed above the layer where the data signal lines are formed, via a second insulating layer.

According to the configuration, the second insulating layer also serves as a shield layer for suppressing an orientation disorder due to an electric field caused by the scanning signal line. It is therefore possible to provide a liquid crystal display panel which has a wide viewing angle characteristic and can carry out a high quality display.

It is preferable that the second insulating layer is thick and has a low dielectric constant. Specifically, it is preferable that the second insulating layer has a thickness of, for example, 1 μm to 3 μm and has a dielectric constant of, for example, 2 to 5. Note, however, that the present invention is not limited to this.

The liquid crystal display panel of the present invention preferably further includes a common electrode provided on a surface of the second insulating substrate which surface touches the liquid crystal layer, the common electrode having a protrusion and/or a notch section serving as orientation separation means.

According to the configuration, it is possible to provide the liquid crystal display panel having a wide viewing angle characteristic.

The present invention is not limited to the embodiments, but can be altered by a skilled person in the art within the scope of the claims. An embodiment derived from a proper combination of technical means disclosed in respective different embodiments is also encompassed in the technical scope of the present invention.

Industrial Applicability

The present invention is applicable to a liquid crystal display panel and a liquid crystal display device.

REFERENCE SIGNS LIST 1, 1a, 1b, 1c, 1d, and 1e Liquid crystal display panel
3 Gate insulating film (first insulating layer)
4 Storage capacitor counter line
4a, 4b, 4c, and 4d Shield electrode
5 Interlayer insulating film (second insulating layer)
6 Contact hole
7 Picture element electrode
7a, 7b, and 20d Notch part
9 Array substrate (first insulating substrate)
13 Common electrode
14 Protrusion section (orientation separation means)
16 Counter substrate (second insulating substrate)
17 Liquid crystal layer
18 TFT element (transistor element)
18G Gate electrode
18S Source electrode
18D Drain electrode
20a, 20b, and 20c Sub-picture-element electrode
P Picture element
CS Storage capacitor line
GL Scanning signal line
SL Data signal line

The invention claimed is:

1. A liquid crystal display panel comprising:
a first insulating substrate having (i) scanning signal lines, (ii) data signal lines intersecting with the scanning signal lines, and (iii) a plurality of transistor elements electrically connected with the scanning signal lines and the data signal lines;
a second insulating substrate provided to face the first insulating substrate; and
a liquid crystal layer provided between the first insulating substrate and the second insulating substrate,
the plurality of transistor elements being provided for respective of a plurality of picture elements arranged in a matrix manner,
a plurality of picture element electrodes being (i) provided for the respective plurality of picture elements, (ii) provided on the first insulating substrate, and (iii) electrically connected with drain electrodes of the respective plurality of transistor elements,
(a) a layer where the plurality of picture element electrodes are formed and (b) a layer where the data signal lines are formed, being located above a layer where the scanning signal lines are formed,
in a region of each of the picture elements in which region a corresponding one of the plurality of picture element electrodes is formed, (i) the corresponding one of the plurality of picture element electrodes and (ii) a corresponding one of the scanning signal lines being formed to overlap each other when viewed from above,
the corresponding one of the plurality of picture element electrodes having a notch part in a region in which the corresponding one of the plurality of picture element electrodes and the corresponding one of the scanning signal lines overlap each other,
a shield electrode being formed, in the layer where the data signal lines are formed, so that (i) the shield electrode and (ii) part of the corresponding one of the scanning signal lines in the notch part at least partially overlap each other when viewed from above.

2. The liquid crystal display panel as set forth in claim 1, wherein:
the corresponding one of the plurality of picture element electrodes is electrically divided into a plurality of sub-picture-element electrodes by the notch part; and
the plurality of sub-picture-element electrodes are electrically connected with a drain electrode of a corresponding one of the plurality of transistor elements which is provided in a corresponding one of the plurality of picture elements.

3. The liquid crystal display panel as set forth in claim 1, wherein:
the shield electrode is electrically connected with the drain electrode of the corresponding one of the plurality of transistor elements.

4. The liquid crystal display panel as set forth in claim 1, wherein:
the corresponding one of the plurality of picture element electrodes is formed so as to have a length in a direction where the corresponding one of the scanning signal lines extends, the length being longer than a length in a direction where the data signal lines extend.

5. The liquid crystal display panel as set forth in claim 1, wherein:
the corresponding one of the plurality of picture element electrodes is cut out such that (i) part of the corresponding one of the scanning signal lines in at least one notch part and (ii) the corresponding one of the plurality of picture element electrodes overlap each other when viewed from above.

6. The liquid crystal display panel as set forth in claim 1, wherein:
in the region of the each of the picture elements in which region the corresponding one of the plurality of picture element electrodes is formed, when viewed from above, (i) the corresponding one of the plurality of picture element electrodes and a storage capacitor line overlap each other and (ii) the corresponding one of the plurality of picture element electrodes and a storage capacitor counter line overlap each other;
the storage capacitor line is formed, in the layer in which the scanning signal lines are formed, so as to extend in a direction in which the scanning signal lines extend;
the storage capacitor counter line is formed, via a first insulating layer, in the layer in which the data signal lines are formed so that the storage capacitor counter line and the storage capacitor line overlap each other at least in the notch part, when viewed from above.

7. The liquid crystal display panel as set forth in claim 6, wherein:
in a case where the drain electrode is formed with respect to the corresponding one of the scanning signal lines, including a gate electrode of the transistor element, so as to be deviated from a design value,
the design value causes (i) the drain electrode to overlap, when viewed from above, with the corresponding one of the scanning signal lines while being deviated in a certain direction and (ii) part of the storage capacitor counter line to overlap, when viewed from above, with part of the storage capacitor line while being deviated in the certain direction
so that an area of a region where the storage capacitor line and the storage capacitor counter line overlap each other when viewed from above is adjusted in accordance with an area of a region where the corresponding one of the scanning signal lines and the drain electrode overlap each other when viewed from above.

8. The liquid crystal display panel as set forth in claim 6, wherein:
the shield electrode is formed in the notch part by extending the storage capacitor counter line to the notch part.

9. The liquid crystal display panel as set forth in claim 8, wherein:
the shield electrode is formed by extending a storage capacitor counter line of one of adjacent picture elements in a direction in which the data signal lines extend.

10. The liquid crystal display panel as set forth in claim 9, wherein:
the corresponding one of the scanning signal lines is formed by being bent so that the corresponding one of the scanning signal lines and the at least one notch part do not overlap each other; and
(i) part of the corresponding one of the scanning signal lines, which is formed at a boundary between (a) the one of adjacent picture elements in the direction in which the data signal lines extend and (b) the corresponding one of the plurality of picture elements, and (ii) the shield electrode, which is formed by extending the storage capacitor counter line of the one of adjacent picture elements, at least partially overlap each other when viewed from above.

11. A liquid crystal display panel as set forth in claim 9, further comprising:
two scanning signal line driving circuits, provided on both sides of the plurality of scanning signal lines, for sequentially supplying identical scanning signals from both ends of each of the scanning signal lines.

12. The liquid crystal display panel as set forth in claim 8, wherein:
the shield electrode is extended to a boundary between (a) one of adjacent picture elements in a direction in which the data signal lines extend and (b) the corresponding one of the plurality of picture elements; and
(i) the shield electrode and (ii) a counter electrode of the shield electrode, which counter electrode is formed by extending a storage capacitor line of the one of the adjacent picture elements, at least partially overlap each other at the boundary when viewed from above.

13. The liquid crystal display panel as set forth in claim 1, wherein:
the corresponding one of the scanning signal lines, formed so that the corresponding one of the scanning signal lines and the corresponding one of the plurality of picture element electrodes overlap each other when viewed from above, is electrically connected with a corresponding one of the plurality of transistor elements which is electrically connected with a picture element electrode formed in one of adjacent picture elements in a direction in which the data signal lines extend.

14. The liquid crystal display panel as set forth in claim 1, wherein:
the plurality of picture element electrodes are formed above the layer where the data signal lines are formed, via a second insulating layer.

15. A liquid crystal display panel as set forth in claim 1, further comprising:
a common electrode provided on a surface of the second insulating substrate which surface touches the liquid crystal layer, the common electrode having a protrusion and/or a notch section serving as orientation separation means.

16. A liquid crystal display device comprising a liquid crystal display panel recited in claim 1.

* * * * *